United States Patent
Niv

(10) Patent No.: US 10,673,719 B2
(45) Date of Patent: Jun. 2, 2020

(54) TECHNIQUES FOR BOTNET DETECTION AND MEMBER IDENTIFICATION

(71) Applicant: Imperva, Inc., Redwood City, CA (US)

(72) Inventor: Nitzan Niv, Nesher (IL)

(73) Assignee: Imperva, Inc., Redwood City, CA (US)

( * ) Notice: Subject to any disclaimer, the term of this patent is extended or adjusted under 35 U.S.C. 154(b) by 345 days.

(21) Appl. No.: 15/442,582

(22) Filed: Feb. 24, 2017

(65) Prior Publication Data

US 2017/0251005 A1 Aug. 31, 2017

Related U.S. Application Data

(60) Provisional application No. 62/300,069, filed on Feb. 25, 2016.

(51) Int. Cl.
| | |
|---|---|
| H04L 12/26 | (2006.01) |
| H04L 29/06 | (2006.01) |
| H04L 29/12 | (2006.01) |
| H04L 29/08 | (2006.01) |

(52) U.S. Cl.
CPC ........... H04L 43/08 (2013.01); H04L 63/145 (2013.01); H04L 63/1425 (2013.01); H04L 63/20 (2013.01); H04L 61/2007 (2013.01); H04L 67/02 (2013.01); H04L 2463/144 (2013.01)

(58) Field of Classification Search
CPC ... H04L 43/08; H04L 63/1425; H04L 63/145; H04L 63/20; H04L 61/2007; H04L 67/02; H04L 2463/144
USPC .......................................................... 726/23
See application file for complete search history.

(56) References Cited

U.S. PATENT DOCUMENTS

| | | | |
|---|---|---|---|
| 7,032,114 B1 | 4/2006 | Moran et al. | |
| 7,788,718 B1 * | 8/2010 | Fei ..................... | H04L 63/1458 |
| | | | 726/14 |
| 7,870,610 B1 | 1/2011 | Mitchell et al. | |
| 8,079,083 B1 | 12/2011 | Bennett et al. | |
| 8,392,991 B2 | 3/2013 | Ansari et al. | |
| 8,539,582 B1 | 9/2013 | Aziz et al. | |
| 8,555,388 B1 | 10/2013 | Wang et al. | |

(Continued)

OTHER PUBLICATIONS

Shishir Nagaraja, BotGrep: Finding Bots with Structured Graph Analysis,Apr. 9, 2010, University of Illinois at Urbana-Champaign, pp. 1-24 (Year: 2010).*

(Continued)

*Primary Examiner* — Shahriar Zarrineh
(74) *Attorney, Agent, or Firm* — Nicholson De Vos Webster & Elliott LLP

(57) ABSTRACT

A botnet identification module identifies members of one or more botnets based upon network traffic destined to one or more servers over time, and provides sets of botnet sources to a traffic monitoring module. Each set of botnet sources includes a plurality of source identifiers of end stations acting as part of a corresponding botnet. A traffic monitoring module receives the sets of botnet sources from the botnet identification module, and upon a receipt of traffic identified as malicious that was sent by a source identified within one of the sets of botnet sources, activates a protection mechanism with regard to all traffic from all of the sources identified by the one of the sets of botnet sources for an amount of time.

17 Claims, 14 Drawing Sheets

(56) References Cited

U.S. PATENT DOCUMENTS

| | | | |
|---|---|---|---|
| 8,561,184 B1* | 10/2013 | Marsa | H04L 67/22 |
| | | | 726/22 |
| 8,561,188 B1 | 10/2013 | Wang et al. | |
| 8,584,236 B2 | 11/2013 | El-Moussa et al. | |
| 8,682,812 B1 | 3/2014 | Ranjan et al. | |
| 8,762,298 B1 | 6/2014 | Ranjan et al. | |
| 8,887,279 B2* | 11/2014 | Dheap | H04L 63/20 |
| | | | 726/1 |
| 9,166,994 B2* | 10/2015 | Ward | H04L 63/1425 |
| 9,288,220 B2* | 3/2016 | Raugas | H04L 63/1408 |
| 9,350,758 B1 | 5/2016 | Aharoni et al. | |
| 9,628,507 B2* | 4/2017 | Haq | H04L 63/145 |
| 9,635,049 B1* | 4/2017 | Oprea | H04L 63/145 |
| 9,654,485 B1* | 5/2017 | Neumann | H04L 63/1416 |
| 9,705,895 B1 | 7/2017 | Gutzmann et al. | |
| 9,749,336 B1* | 8/2017 | Zhang | H04L 63/14 |
| 9,930,065 B2* | 3/2018 | Nelms | H04L 63/145 |
| 10,027,688 B2 | 7/2018 | Perdisci et al. | |
| 2006/0107324 A1 | 5/2006 | Chirra et al. | |
| 2008/0028467 A1* | 1/2008 | Kommareddy | H04L 63/1458 |
| | | | 726/23 |
| 2009/0249481 A1 | 10/2009 | Long et al. | |
| 2010/0037314 A1 | 2/2010 | Perdisci et al. | |
| 2010/0067377 A1 | 3/2010 | Wang et al. | |
| 2010/0095374 A1* | 4/2010 | Gillum | G06Q 30/02 |
| | | | 726/22 |
| 2010/0162350 A1 | 6/2010 | Jeong et al. | |
| 2010/0162399 A1 | 6/2010 | Sheleheda et al. | |
| 2010/0235879 A1 | 9/2010 | Burnside et al. | |
| 2011/0055923 A1 | 3/2011 | Thomas | |
| 2011/0072516 A1 | 3/2011 | Cohen et al. | |
| 2011/0078791 A1 | 3/2011 | Prakash et al. | |
| 2011/0099622 A1* | 4/2011 | Lee | H04L 43/16 |
| | | | 726/13 |
| 2011/0153811 A1 | 6/2011 | Jeong et al. | |
| 2011/0154489 A1 | 6/2011 | Jeong et al. | |
| 2011/0154492 A1 | 6/2011 | Jeong et al. | |
| 2011/0179164 A1* | 7/2011 | Memon | H04L 63/1441 |
| | | | 709/224 |
| 2011/0270969 A1 | 11/2011 | Noh et al. | |
| 2012/0054869 A1 | 3/2012 | Yen et al. | |
| 2012/0084860 A1* | 4/2012 | Cao | H04L 63/1441 |
| | | | 726/23 |
| 2012/0198549 A1* | 8/2012 | Antonakakis | H04L 61/1511 |
| | | | 726/22 |
| 2012/0233694 A1 | 9/2012 | Baliga et al. | |
| 2013/0097699 A1 | 4/2013 | Balupari et al. | |
| 2013/0117847 A1 | 5/2013 | Friedman et al. | |
| 2013/0174253 A1* | 7/2013 | Thomas | H04L 63/1416 |
| | | | 726/22 |
| 2014/0013434 A1 | 1/2014 | Ranum et al. | |
| 2014/0047543 A1 | 2/2014 | Kim et al. | |
| 2014/0096194 A1 | 4/2014 | Bhogavilli et al. | |
| 2014/0096251 A1 | 4/2014 | Doctor et al. | |
| 2014/0310811 A1 | 10/2014 | Hentunen et al. | |
| 2014/0331280 A1 | 11/2014 | Porras et al. | |
| 2014/0373148 A1* | 12/2014 | Nelms | H04L 63/1441 |
| | | | 726/23 |
| 2014/0379628 A1* | 12/2014 | Agrawal | G06Q 10/107 |
| | | | 706/48 |
| 2015/0052595 A1 | 2/2015 | Murphy et al. | |
| 2015/0082399 A1 | 3/2015 | Wu et al. | |
| 2015/0096020 A1* | 4/2015 | Adams | H04L 63/1458 |
| | | | 726/23 |
| 2015/0188941 A1* | 7/2015 | Boshmaf | H04L 63/1441 |
| | | | 726/22 |
| 2015/0195299 A1* | 7/2015 | Zoldi | H04L 63/1433 |
| | | | 726/25 |
| 2015/0207809 A1* | 7/2015 | Macaulay | G06F 21/552 |
| | | | 726/22 |
| 2015/0215334 A1 | 7/2015 | Bingham et al. | |
| 2015/0241376 A1* | 8/2015 | Wang | G01N 27/3272 |
| | | | 204/403.01 |
| 2015/0264068 A1* | 9/2015 | Beauchesne | H04L 63/1416 |
| | | | 726/23 |
| 2015/0288715 A1 | 10/2015 | Hotchkiss | |
| 2015/0304198 A1 | 10/2015 | Angelov et al. | |
| 2015/0341361 A1 | 11/2015 | Fransen et al. | |
| 2016/0006755 A1* | 1/2016 | Donnelly | H04L 63/0263 |
| | | | 726/1 |
| 2016/0028753 A1* | 1/2016 | Di Pietro | H04L 63/1425 |
| | | | 726/23 |
| 2016/0028765 A1* | 1/2016 | Lingafelt | H04L 63/1458 |
| | | | 726/23 |
| 2016/0044054 A1 | 2/2016 | Stiansen et al. | |
| 2016/0065601 A1 | 3/2016 | Gong et al. | |
| 2016/0205120 A1* | 7/2016 | Marck | H04L 63/1416 |
| | | | 726/23 |
| 2016/0294859 A1 | 10/2016 | Choi et al. | |
| 2016/0337402 A1 | 11/2016 | Mittig et al. | |
| 2016/0381048 A1* | 12/2016 | Zhao | H04L 63/1416 |
| | | | 726/23 |
| 2017/0063921 A1 | 3/2017 | Fridman et al. | |
| 2017/0104773 A1 | 4/2017 | Flacher et al. | |
| 2017/0180312 A1 | 6/2017 | Sullivan et al. | |
| 2017/0251016 A1 | 8/2017 | Niv et al. | |
| 2017/0374084 A1 | 12/2017 | Inoue et al. | |
| 2018/0046811 A1* | 2/2018 | Andriani | G06F 21/55 |

OTHER PUBLICATIONS

M. Patrick Collins1 and Michael K. Reiter, Hit-List Worm Detection and Bot Identification in Large Networks Using Protocol Graphs; Sep. 2007, CERT/Network Situational Awareness, Software Engineering Institute,Carnegie Mellon University; mcollins@cert.org, pp. 1-20 (Year: 2007).*

S StanifordChen, GrIDSA Graph Based Intrusion Detection System for Large Networks, 1996, Department of Computer Science, University of California, Davis, pp. 1-10 (Year: 1996).*

Non-Final Office Action from U.S. Appl. No. 15/442,560, dated Dec. 28, 2018, 19 pages.

Non-Final Office Action from U.S. Appl. No. 15/442,571, dated Jan. 11, 2019, 28 pages.

Non-Final Office Action from U.S. Appl. No. 15/442,560, dated Jun. 12, 2019, 23 pages.

Final Office Action from U.S. Appl. No. 15/442,571, dated Jul. 25, 2019, 34 pages.

Advisory Action, U.S. Appl. No. 15/442,571, dated Nov. 1, 2019, 3 pages.

Final Office Action, U.S. Appl. No. 15/442,560, dated Nov. 6, 2019, 24 pages.

Non-Final Office Action, U.S. Appl. No. 15/442,560, dated Mar. 17, 2020, 38 pages.

Advisory Action, U.S. Appl. No. 15/442,560, dated Jan. 29, 2020, 4 pages.

Non-Final Office Action, U.S. Appl. No. 15/442,571, dated Jan. 31, 2020, 30 pages.

* cited by examiner

```
                                                                          500
                                                                         ↙
┌──────────────────────────────────────────────────────────────────────────────┐
│ WHEN TRAFFIC IDENTIFIED AS MALICIOUS IS RECEIVED FROM ONE OF THE SOURCE       │
│ IDENTIFIERS OF ONE OF THE BOTNETS, ACTIVATE A PROTECTION MECHANISM            │
│ (E.G., BLOCK) FOR ALL TRAFFIC FROM ALL MEMBERS OF THAT BOTNET FOR AN          │
│ AMOUNT OF TIME 210                                                            │
│                                                                              │
│   ┌────────────────────────────────────────────────────────────────────┐     │
│   │ RECEIVE ONE OR MORE SETS OF BOTNET SOURCES, WHERE EACH SET         │     │
│   │ INCLUDES A PLURALITY OF SOURCE IP ADDRESSES OF A BOTNET 505        │     │
│   └────────────────────────────────────────────────────────────────────┘     │
│                                    │                                         │
│                                    ▼                                         │
│   ┌────────────────────────────────────────────────────────────────────┐     │
│   │ RECEIVE TRAFFIC FROM AN IP ADDRESS OF ONE OF THE BOTNETS THAT IS   │     │
│   │ DESTINED TO A SERVER 510                                           │     │
│   └────────────────────────────────────────────────────────────────────┘     │
│                                    │                                         │
│                                    ▼                                         │
│   ┌────────────────────────────────────────────────────────────────────┐     │
│   │ UPON DETERMINING THAT THE TRAFFIC IS MALICIOUS:                    │     │
│   │                                                                    │     │
│   │ PERFORM A PROTECTIVE ACTION WITH REGARD TO THE TRAFFIC, AND        │     │
│   │                                                                    │     │
│   │ ENABLE A BOTNET SECURITY MEASURE, INCLUDING CONFIGURING THE        │     │
│   │ TRAFFIC MONITORING MODULE TO PERFORM THE PROTECTIVE ACTION         │     │
│   │ AGAINST ANY TRAFFIC RECEIVED FROM ANY OF THE SOURCE IP             │     │
│   │ ADDRESSES OF THE ONE BOTNET FOR A PERIOD OF TIME                   │     │
│   │                                                                    │     │
│   │ (WHEREIN THE PERIOD OF TIME IS BASED UPON THE DETERMINED           │     │
│   │ DURATION OF ATTACK FROM THAT BOTNET)                               │     │
│   │ 515                                                                │     │
│   └────────────────────────────────────────────────────────────────────┘     │
│                                    │                                         │
│                                    ▼                                         │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐     │
│     RECEIVE, DURING THE PERIOD OF TIME, TRAFFIC FROM ANOTHER IP             │
│   │ ADDRESS OF THE ONE BOTNET 520                                      │     │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘     │
│                                    │                                         │
│                                    ▼                                         │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐     │
│   │ PERFORM THE PROTECTIVE ACTION AGAINST THE TRAFFIC 525              │     │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘     │
│                                    │                                         │
│                                    ▼                                         │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐     │
│   │ DISABLE THE BOTNET SECURITY MEASURE FOR THE BOTNET                 │     │
│     (RESPONSIVE TO AN EXPIRATION OF A TIMER)                                │
│   │ (RESPONSIVE TO NOT RECEIVING ANY TRAFFIC FROM ANY IP OF THE        │     │
│     BOTNET FOR A THRESHOLD AMOUNT OF TIME) 530                              │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘     │
└──────────────────────────────────────────────────────────────────────────────┘
```

*FIG. 5*

```
                                                                    1400
                                                                     ↙
┌─────────────────────────────────────────────────────────────────────────┐
│  OBTAIN TRAFFIC DATA FROM ONE OR MORE TRAFFIC MONITORING MODULES (TMMS) │
│ IMPLEMENTED BY ONE OR MORE ELECTRONIC DEVICES, WHEREIN THE TRAFFIC DATA │
│ INCLUDES OR IS BASED UPON A PLURALITY OF REQUEST MESSAGES THAT WERE     │
│ ORIGINATED BY ONES OF THE PLURALITY OF END STATIONS AND THAT WERE       │
│ DESTINED TO ONE OR MORE SERVERS, WHEREIN EACH OF THE ONE OR MORE TMMS   │
│ IS DEPLOYED IN FRONT OF AT LEAST ONE OF THE ONE OR MORE SERVERS IN THAT │
│ THE TMM RECEIVES ALL NETWORK TRAFFIC ORIGINATED BY THE PLURALITY OF END │
│      STATIONS THAT IS DESTINED FOR THE AT LEAST ONE SERVER              │
│                                  1405                                   │
└─────────────────────────────────────────────────────────────────────────┘
                                    │
                                    ▼
┌─────────────────────────────────────────────────────────────────────────┐
│ GENERATE, BASED UPON THE OBTAINED TRAFFIC DATA, A SET OF IDENTIFIERS    │
│ CORRESPONDING TO THE SUBSET OF THE PLURALITY OF END STATIONS THAT ARE   │
│ DETERMINED BY THE BIM TO BE COLLECTIVELY ACTING AS THE SUSPECTED BOTNET │
│ IN THAT THEY HAVE TRANSMITTED REQUEST MESSAGES, DESTINED FOR ONE OR     │
│ MORE OF THE ONE OR MORE SERVERS, THAT COLLECTIVELY OR INDIVIDUALLY      │
│ SATISFY ONE OR MORE SECURITY RULES WHICH, WHEN SATISFIED, INDICATE A    │
│ MALICIOUS ATTACK, WHEREIN THE SET OF IDENTIFIERS COMPRISES A PLURALITY  │
│                           OF IDENTIFIERS                                │
│                                  1410                                   │
└─────────────────────────────────────────────────────────────────────────┘
                                    │
                                    ▼
┌─────────────────────────────────────────────────────────────────────────┐
│ TRANSMIT THE SET OF IDENTIFIERS TO THE ONE OR MORE TMMS TO CAUSE THE    │
│ ONE OR MORE TMMS TO UTILIZE THE SET OF IDENTIFIERS WHILE ANALYZING      │
│ SUBSEQUENT REQUEST MESSAGES DESTINED TO THE ONE OR MORE SERVERS TO      │
│ DETECT AN ATTACK FROM THE SUSPECTED BOTNET AND TO PROTECT THE ONE OR    │
│                      MORE SERVERS FROM THE ATTACK                       │
│                                  1415                                   │
└─────────────────────────────────────────────────────────────────────────┘
```

*FIG. 14*

TECHNIQUES FOR BOTNET DETECTION AND MEMBER IDENTIFICATION

CROSS-REFERENCE TO RELATED APPLICATIONS

This application claims priority from U.S. Provisional Application No. 62/300,069, filed on Feb. 25, 2016, the content of which is incorporated by reference.

FIELD

Embodiments relate to the field of computer networking; and more specifically, to techniques for botnet identification and targeted botnet protection.

BACKGROUND

A botnet is a group of Internet-connected computing devices communicating with other similar machines in an effort to complete repetitive tasks and objectives. Botnets can include computers whose security defenses have been breached and control conceded to a third party. Each such compromised device, known as a "bot," may be created when a computer is penetrated by software from a malware (i.e., a malicious software) distribution. The controller of a botnet is able to direct the activities of these compromised computers through communication channels formed by standards-based network protocols such as Internet Relay Chat (IRC), Hypertext Transfer Protocol (HTTP), etc.

Computers can be co-opted into a botnet when they execute malicious software. This can be accomplished by luring users into making a drive-by download, exploiting web browser vulnerabilities, or by tricking the user into running a Trojan horse program, which could come from an email attachment. This malware typically installs modules that allow the computer to be commanded and controlled by the botnet's operator. After the software is executed, it may "call home" to the host computer. When the re-connection is made, depending on how it is written, a Trojan may then delete itself, or may remain present to update and maintain the modules. Many computer users are unaware that their computer is infected with bots.

Botnets can include many different computers (e.g., hundreds, thousands, tens of thousands, hundreds of thousands, or more) and the membership of a botnet can change over time.

One type of attack perpetrated by botnets is a distributed denial-of-service (DDoS) attack, in which multiple systems submit as many requests as possible to a single Internet computer or service, overloading it and preventing it from servicing legitimate requests.

The geographic dispersal of botnets typically means that each participant must be individually identified, which limits the benefits of filtering mechanisms. Although a service provider could choose to block all traffic during a botnet attack, this negatively impacts existing users of the service. Further, a service provider could choose to allow all traffic to continue to be processed, but this can significantly affect its quality of service to its regular users, and potentially even "crash" the service altogether. Moreover, it can be tremendously difficult to determine which requests for a service are malicious and which are not, making it very challenging to attempt to selectively deal with only the malicious traffic.

Accordingly, improved techniques for identifying botnet traffic and protecting services from botnet attacks are desired.

BRIEF DESCRIPTION OF THE DRAWINGS

The invention may best be understood by referring to the following description and accompanying drawings that are used to illustrate embodiments of the invention. In the drawings:

FIG. 5 is a flow diagram illustrating exemplary operations for targeted botnet protection according to some embodiments.

FIGS. 8-11 illustrate operations for botnet member identification according to some embodiments, in which:

FIG. 8 is a block diagram illustrating exemplary operations including malicious event identification for botnet member identification according to some embodiments.

FIG. 9 is a block diagram illustrating exemplary operations including traffic source similarity determination for botnet member identification, which can be performed after the operations of FIG. 8, according to some embodiments.

FIG. 10 is a block diagram illustrating exemplary operations including periodic-source cluster generation for botnet member identification, which can be performed after the operations of FIG. 9, according to some embodiments.

FIG. 11 is a block diagram illustrating exemplary operations including attacking-clusters graph generation and botnet identification for botnet member identification, which can be performed after the operations of FIG. 10, according to some embodiments.

FIG. 14 is a flow diagram illustrating exemplary operations for identifying a subset of a plurality of end stations that collectively act as a suspected botnet according to some embodiments.

DESCRIPTION OF EMBODIMENTS

Figure 1:
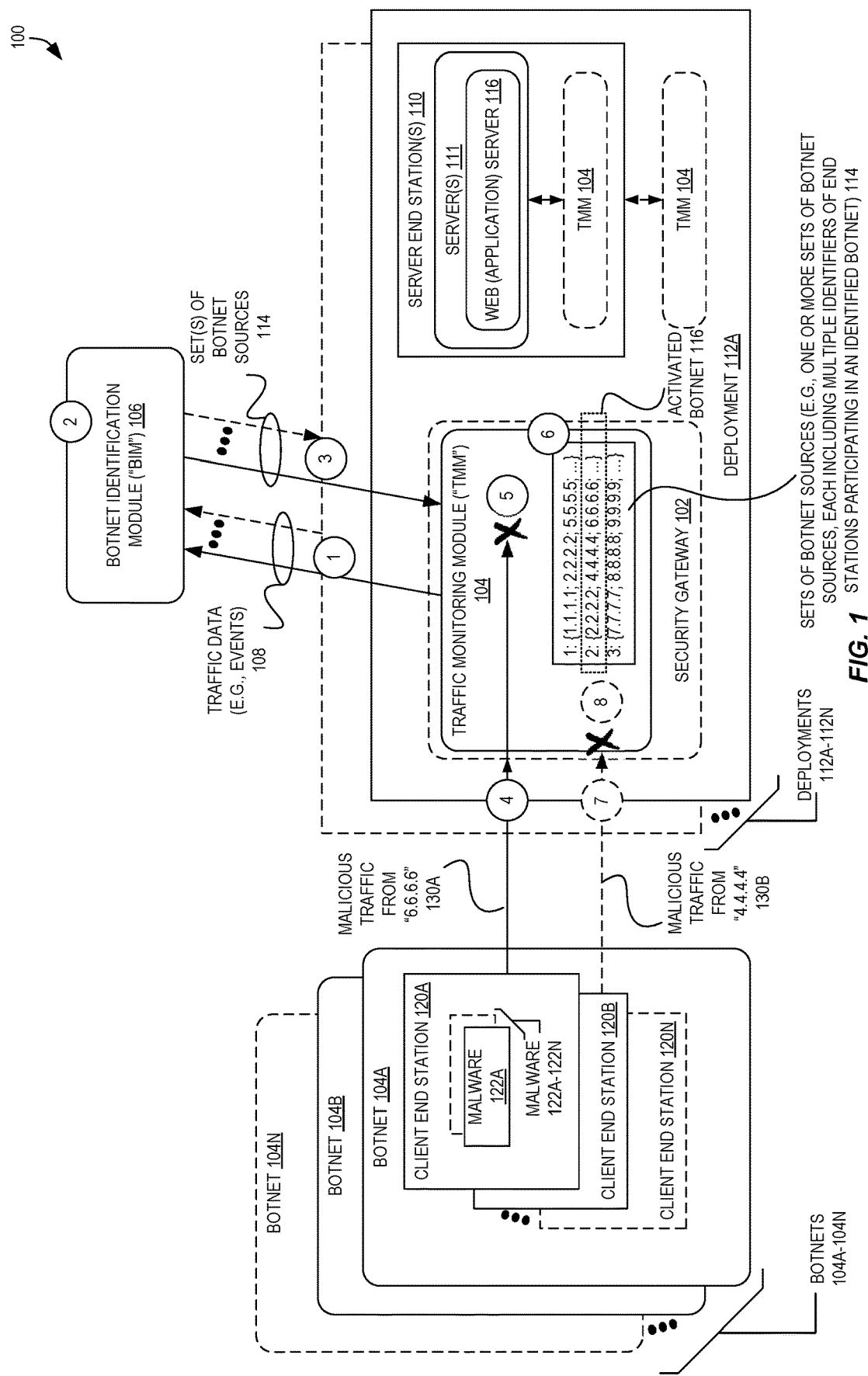
FIG. 1 is a block diagram illustrating botnet member identification and targeted botnet protection according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a Uniform Resource Locator (URL) is one type of Uniform Resource Identifier (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of various embodiments may be implemented using different combinations of software, firmware, and/or hardware.

Embodiments described herein provide for methods, systems, non-transitory computer readable media, and apparatuses for botnet identification and for targeted botnet protection.

In some embodiments, members of a botnet can be identified by observing incoming traffic to a set of servers (e.g., web application servers) over time, finding behavior-similarity between the sources of the traffic that is malicious by examining the traffic broken into time-periods, and finding associates between sets of sources that have many members and persist over a long time duration. In some embodiments, sets of botnet sources can thus be identified, where each set of botnet sources includes multiple source identifiers (e.g., Internet Protocol (IP) addresses utilized by the end stations participating in a particular botnet).

In some embodiments, sets of botnet sources can be utilized to enable targeted botnet protection. A traffic monitoring module, upon detecting incoming traffic destined to a server that is deemed as malicious according to a security rule, can identify whether the source of that malicious traffic is identified within any of the sets of botnet sources. When the source of the received malicious traffic is determined to be within one of the sets of botnet sources, security measures can be activated for any further traffic received from any of the sources of that one set of botnet sources for a period of time. Accordingly, instead of following a naive approach of immediately blocking all traffic from all of the sets of botnet sources—which would likely interrupt some non-malicious traffic, as many devices acting as part of a botnet are frequently used for non-malicious purposes—some embodiments can protect against attacks from these botnets with a fine-grained approach that is limited to an attacking botnet, and can be limited to a particular time period (e.g., the length of the attack), to thereby allow subsequent non-malicious activity from those sources to be processed in an uninterrupted manner.

FIG. 1 is a block diagram illustrating a system 100 providing botnet member identification and targeted botnet protection according to some embodiments. Although "botnet member identification" and "targeted botnet protection" may be described together in this Figure and throughout this description, it is to be understood that these techniques may also be separately/individually utilized without the other technique.

In FIG. 1, a set of one or more server end stations 110 execute or otherwise implement one or more servers 111 providing access to data. In the embodiment depicted in this Figure, the server end stations 110 implement a web application server 116, though in other embodiments the set of server end stations 110 can enable other types of servers, including but not limited to database servers, file servers, print servers, mail servers, gaming servers, application servers, Domain Name System (DNS) servers, etc.

The set of server end stations 110 may be "protected" by a security gateway 102. Security gateways 102—such as firewalls, database firewalls, file system firewalls, and web application firewalls (WAFs)—are network security systems that protect software applications (e.g., web application server(s) 116 or servers 111) executing on electronic devices (e.g., server end station(s) 110) within a network by controlling the flow of network traffic passing through the security gateway 102. By analyzing packets flowing through the security gateway 102 and determining whether those packets should be allowed to continue traveling through the network, the security gateway 102 can prevent malicious traffic from reaching a protected server, modify the malicious traffic, and/or create an alert to trigger another responsive event or notify a user of the detection of the malicious traffic.

In some embodiments, the security gateway 102 is communicatively coupled between one or more client end stations 120A-120N and the server end stations 110, such that all traffic destined to the server end stations 110 is first passed through (or made available to) the security gateway 102 for analysis. In some embodiments, the security gateway 102 executes as part of a separate server end station or a (dedicated or shared) network device; but in other embodiments, the security gateway 102 operates as part of server end station(s) 110 (for example, as a software module), or is implemented using or another type of electronic device and can be software, hardware, or a combination of both. Further detail regarding security gateways will be described later herein with regard to FIGS. 6 and 7.

Client end stations 120A-120N (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes, etc.) are computing devices operable to execute applications 126 that, among other functions, can access the content/services provided by other computing devices, such as the server end stations 110.

In this example, the client end stations 120 include one (or possibly multiple) malware 122 modules that cause the client end stations 120 to participate in one (or more) botnets 104A-104N. In some cases, a client end station (e.g., 120A) may be infected with malware 122 while the user (e.g., owner/operator) of the client end station is unaware of the infection. Thus, the user may continue to operate their client end station in a non-malicious manner, and the client end station may act as part of a botnet (e.g., receive commands from a controller, begin transmitting malicious traffic, etc.) and perform malicious actions without the user's knowledge, perhaps even concurrently while the user is actively utilizing the client end station.

In some embodiments, a traffic monitoring module 104 or "TMM" (which may be implemented within a security gateway 102) can be configured to receive network traffic from client end stations 120 that is directed to one or more server(s) 111, and provide traffic data 108 (e.g., raw traffic/captures of packets, "event" data structures that represent certain traffic, etc.) to a botnet identification module ("BIM") 106 at circle '1'. In some embodiments, the BIM 106 may receive such traffic data 108 from only one deployment 112A (e.g., one or more traffic monitoring modules 104 of a particular enterprise, network, etc.), though in other embodiments the BIM 106 may receive such traffic data 108 from multiple deployments 112A-112N.

In some embodiments, the BIM 106 performs an analysis of this traffic data 108 at circle '2' to determine one or more sets of botnet sources. Each set of botnet sources from the one or more sets of botnet sources can be specific to a particular botnet, and include source identifiers for each client end station determined to belong to that botnet (or, determined as being highly likely as belonging to a botnet). In some embodiments, each source identifier comprises an IP address, such as an IPv4 address or IPv6 address. Further detail describing exemplary techniques for botnet membership determinations is presented later herein with regard to FIGS. 3 and 4.

At circle '3', the determined sets of botnet sources 114 can be provided from the BIM 106 to one or more TMMs 104, which may be located at one or more deployments 112A-112N.

In some embodiments, the TMM 104 can utilize the sets of botnet sources 114 to protect the server(s) 111 (and/or other infrastructure) against the identified botnets. A partial representation of sets of botnet sources 114 is illustrated herein as including (at least) three sets of botnet sources. A first set of botnet sources is illustrated as including at least three sources: 1.1.1.1, 2.2.2.2, and 5.5.5.5. A second set of botnet sources is illustrated as including at least three sources: 2.2.2.2, 4.4.4.4, and 6.6.6.6. A third set of botnet sources is illustrated as including at least three sources: 7.7.7.7, 8.8.8.8, and 9.9.9.9. Of course, more or fewer sets of botnet sources may be used, and the sets of botnet sources may include more or fewer source identifiers. Additionally, in some scenarios a single source identifier (e.g., 2.2.2.2) may exist in multiple different ones of the sets (such as when a single client end station using that IP address has been infected with multiple malware types and thus is a member of multiple botnets), though in other scenarios this may not be the case.

At circle '4', the TMM 104 may receive malicious traffic 130A from a source "6.6.6.6" (from client end station 120A), and analyze the traffic 130A (e.g., according to security rules) to determine that it is in fact malicious. The TMM 104 may be configured to perform a protective action at circle '5' in response, such as blocking the traffic 130A (e.g., dropping the packets so that they are not sent to the destination server), downgrading the priority of the traffic in being processed/forwarded, modifying the traffic, reporting the incident to another device or human user, etc.

In some embodiments, the TMM 104 can also consult the sets of botnet sources 114 by performing a lookup using a source identifier from the malicious traffic 130A. For example, a source IP address from an IP header of the traffic may serve as a source identifier, though other source identifiers can also be used, including but not limited to a value from a User-Agent header field of an HTTP request message (which may be able to uniquely identify a source), an IP address from an X-Forwarded-For (XFF) header field of an HTTP request message (which may identify an originating source of the message when the traffic is being passed via an intermediate proxy or load balancer), etc. In this example, the source IP address of the traffic 130A (i.e., 6.6.6.6) is found to exist within the second set of botnet sources. Accordingly, it is likely that a botnet attack from that botnet (e.g., botnet 104A) is beginning.

In response, at circle '6', the TMM 104 can "activate" one or more protection measures for any additional traffic that may be received from any of the source identifiers in that second set—i.e., 2.2.2.2, 4.4.4.4, 6.6.6.6, and so on. Thus, upon a receipt (e.g., a short time later) of malicious traffic 130B from client end station 120B (using a source IP of 4.4.4.4) at circle '7', the TMM 104 can immediately perform the activated protection measure for the traffic 130B (at circle '8', such as "dropping" the traffic by not forwarding it on to its intended destination), potentially even before performing any other security analysis of the traffic. Accordingly, in some embodiments, a potentially large amount of traffic that may arrive from a botnet in a potentially short amount of time can be quickly managed (e.g., dispensed with), thus enabling the TMM 104 to more easily accommodate the additional load from the attack and likely preserve resources for continuing to process non-malicious traffic destined for the server(s) 111—whether they are targeted by the botnet or not.

Notably, in some embodiments, when the source of the malicious traffic 130A (in the example, 6.6.6.6) exists within multiple sets of botnet sources, embodiments may "activate" protection measures for all of these botnets. In some embodiments, these protection measures may be activated for different amounts of time based upon the characteristics of the particular involved botnets, such as the average or maximum length of time observed for attacks from those particular botnets.

In some embodiments, at the expiration of a time period, the activated protection measures can be disabled. The time period can be a constant value (e.g., 1 minute, 5 minutes, 10 minutes, 20 minutes, 1 hour, etc.), which may be different based upon the particular botnet. For example, in some embodiments the length of the time period can be based upon previously-detected activity of that botnet, and could be based upon an average attack length of time observed from that botnet, a maximum attack length of time observed from that botnet, etc.

Moreover, in some embodiments the time period may continue indefinitely until a condition is satisfied. For example, a condition may be configured such that the condition is met when no traffic is observed from any of the sources within the particular botnet for a threshold period of time (e.g., 5 minutes, 15 minutes, 1 hour, etc.).

As described above with regard to circle '4', the TMM 104 may receive malicious traffic 130A and analyze the traffic 130A to determine that it is malicious. In some embodiments, this analysis may be based upon one or more packets arriving from one particular client end station (e.g., 120A).

However, in some embodiments the analysis can be expanded to be based upon traffic from multiple client end stations. For example, a security rule could be configured to watch for a number of occurrences of a particular pattern within traffic within an amount of time (e.g., when X packets are received within Y seconds that include a particular character Z). As described above, this security rule could be applied to one particular source, and thus trigger when one source, for example, sends X packets within Y seconds that include a particular character Z. In that case, the TMM 104 can activate protection measures against all sources within a shared set of botnet sources that includes the transmitting entity. However, in some embodiments the security rule could also or alternatively be triggered when the condition is met due to traffic from multiple sources within a same set of botnet sources (i.e., within a same botnet). Thus, in some embodiments, the condition can be satisfied when two or more sources within a set of botnet sources—but potentially not any of them individually—satisfies the condition. For example, the rule could be triggered (and the protection measures activated for the botnet), when a rule requires that 10 particular packets are received, and a first client (in the botnet) sends 5 such packets and a second client (also in the same botnet) sends 5 such packets. Accordingly, the security rule can look at traffic over time from multiple members of a botnet, which can make this protection scheme more granular that watching an entire botnet, but more comprehensive than just watching one particular source.

Figure 2:
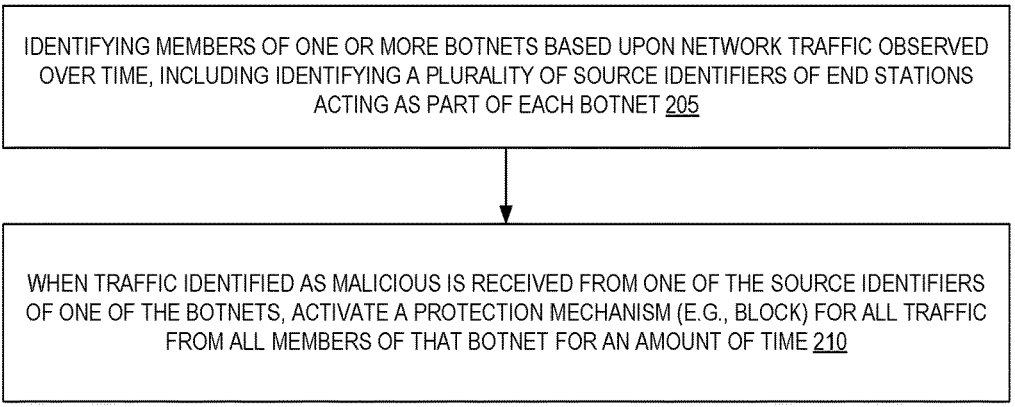
FIG. 2 is a flow diagram illustrating operations for botnet member identification and targeted botnet protection according to some embodiments.

In some embodiments, both botnet member identification and targeted botnet protection techniques can be utilized together. For example, FIG. 2 is a flow diagram illustrating operations 200 for botnet member identification and targeted botnet protection according to some embodiments.

The operations 200 include, at block 205, identifying members of one or more botnets based upon network traffic observed over time, which includes identifying a plurality of source identifiers (e.g., IP addresses) of end stations acting as part of each botnet.

The operations also include, at block 210, when traffic identified as malicious is received from one of the source identifiers of one of the botnets, blocking all traffic from all members of that botnet for an amount of time.

Figure 3:
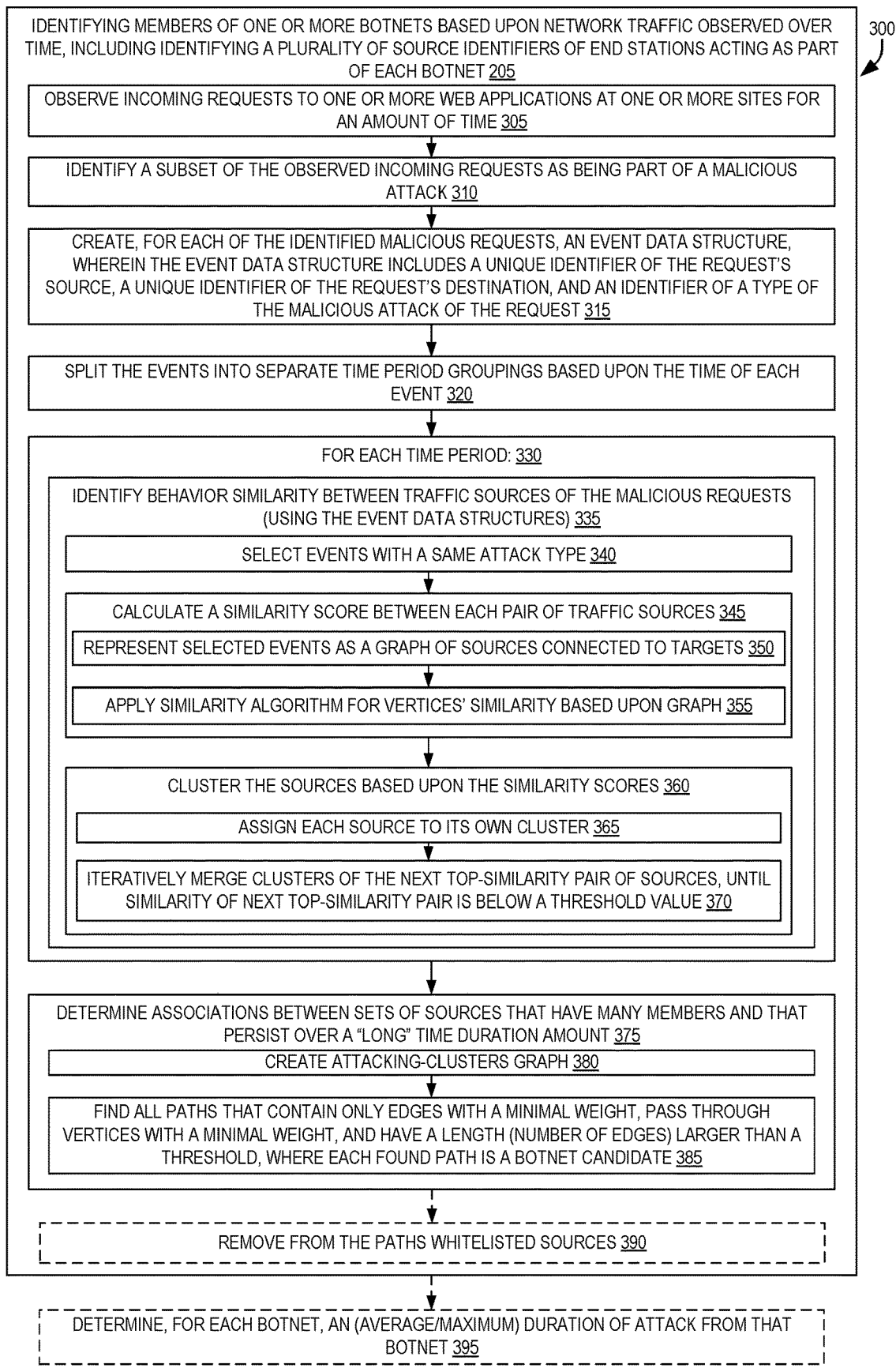
FIG. 3 is a flow diagram illustrating exemplary operations for botnet member identification according to some embodiments.

FIG. 3 is a flow diagram illustrating exemplary operations 300 for botnet member identification according to some embodiments. These operations 300 can be a part of block 205 shown in FIG. 2.

In some embodiments, the operations 300 include at block 305 observing incoming requests to one or more web applications at one or more sites for an amount of time, and at block 310, identifying a subset of the observed incoming requests as being part of a malicious attack. The operations 300 can also include at block 315, creating, for each of the identified malicious requests, an event data structure. The event data structure can include a unique identifier of the request's source, a unique identifier of the request's destination, and an identifier of a type of the malicious attack of the request. In some embodiments, blocks 305 and 310 and 315 may be performed by the TMM 104, though one or more of these blocks could also be performed by the BIM 106.

Figure 4:
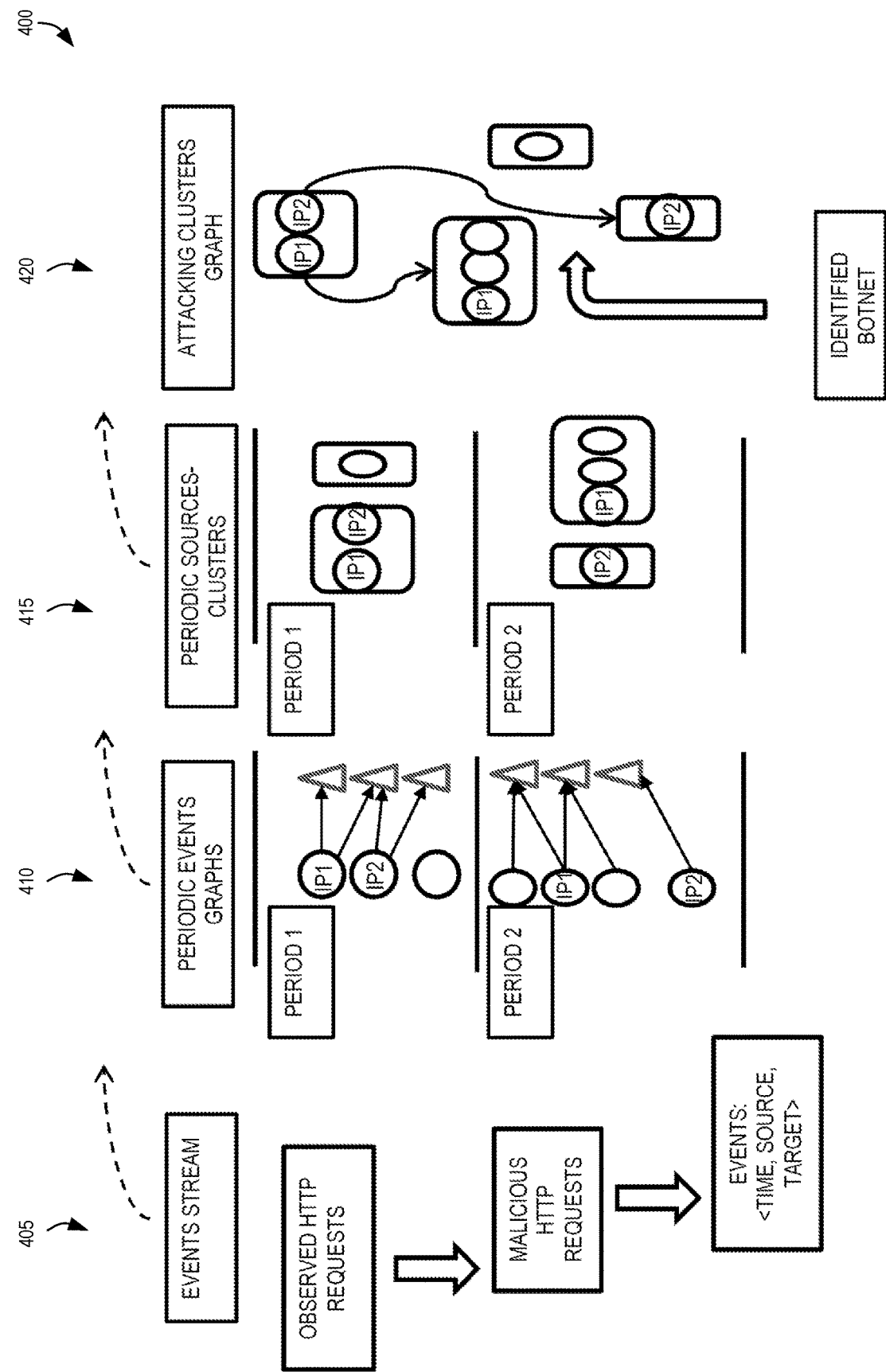
FIG. 4 is a block diagram illustrating botnet member identification according to some embodiments.

These operations are further illustrated at 405 of FIG. 4, which is a block diagram 400 illustrating botnet member identification concepts according to some embodiments.

At block 320, the events are split into separate time period groupings based upon the time of each event.

Then, for each time period (330), the operations include identifying behavior similarity between traffic sources of the malicious requests (using the event data structures) at block 335.

In some embodiments, block 335 includes blocks 340-370. At block 340, events of a same attack type are selected, and at block 345 a similarity score is calculated between each pair of traffic sources. In some embodiments, calculating a similarity score includes representing selected events as a graph of sources connected to targets (350) and applying a similarity algorithm for vertices' similarity based upon graph (355). As an example, see illustration 410 of FIG. 4.

At block 360, the sources can be clustered based upon the similarity scores. Block 360 in some embodiments includes assigning each source to its own cluster (365), and iteratively merging clusters of the next top-similarity pair of sources until the similarity of the next-examined top-similarity pair is below a threshold value (370). As an example, see illustration 415 of FIG. 4.

At block 375, associations are determined between sets of sources that have a threshold amount of members (or, "many" members) that persisted over a threshold amount of time (or, a "long" amount of time). In some embodiments, block 375 includes creating an attacking-clusters graph (380) (as an example, see illustration 420 of FIG. 4), and finding (385) all paths that contain only edges with a minimal weight, that pass through vertices with a minimal weight, and have a length (e.g., number of edges) larger than a threshold amount of edges. This can result with each path being a botnet "candidate"—i.e., each path may be a set of botnet sources, subject to further processing.

For example, optionally at block 390, in some embodiments further processing may be performed where sources can be removed from the paths that belong to a list of whitelisted sources. For example, in some embodiments the sources associated with known Content Distribution Networks (CDNs), search engines, known scanning services, etc., can be removed from the paths (lists) of botnet sources, as blocking traffic from these sources—regardless of whether some of it may be malicious—could be problematic to the operation of the protected server(s) 111.

In some embodiments, blocks 320-395 may be performed by the BIM 106, though in other embodiments some or all of these blocks could be performed by other modules.

FIG. 5 is a flow diagram illustrating exemplary operations 500 for targeted botnet protection according to some embodiments. In some embodiments, the operations 500 may be for block 210 of FIG. 2, i.e., when traffic identified as malicious is received from one of the source identifiers of one of the botnets, block all traffic from all members of that botnet for an amount of time. In some embodiments, some or all of these operations 500 may be performed by the TMM 104 described herein.

The operations 500 can include, at block 505, receiving one or more sets of botnet sources, where each set includes a plurality of source IP addresses of a botnet. Then, at block 510, traffic can be received from an IP address of one of the botnets (e.g., is identified within at least one of the sets of botnet sources) that is destined to a server.

In some embodiments, at block 515 upon determining that the traffic is malicious, the operations 500 can include performing a protective action with regard to the traffic, such as "blocking" it from being forwarded to the server, subjecting it to additional analysis, notifying a user or process, assigning it a lower or different processing priority value, etc. Additionally, 515 can include enabling a botnet security measure to be utilized against any traffic received from any of the source IP addresses belonging to the botnet (of which the source IP of received traffic belongs to) for a period of time. This can include, in some embodiments, subjecting such traffic to the same protective action that has been performed with regard to the traffic (e.g., blocking it), though it could include performing different actions. In some embodiments, optionally the "period of time" for enabling the security measure can be based upon a determined duration of attack involving that particular botnet, and could be based upon an average or maximum duration of attack involving that particular botnet.

Optionally, the operations 500 also include blocks 520, 525, and 530. At block 520, during the period of time in which the botnet security measure is activated, traffic is received from another IP address of the one botnet. At block 525, the protective action is performed against the traffic, due to the traffic being originated by a member of the same botnet.

At some point, at block 530, the botnet security measure can be disabled for the botnet. In some embodiments, the disabling occurs responsive to an expiration of a timer, and in some embodiments, the disabling occurs responsive to not receiving any traffic from any IP of the botnet for a threshold amount of time.

Exemplary Deployment Environment

As described herein, the various involved components can be deployed in various configurations for various purposes. For example, FIG. 6 is a block diagram illustrating an exemplary on premise deployment environment for a TMM 104 and/or BIM 106 according to some embodiments.

Figure 6:
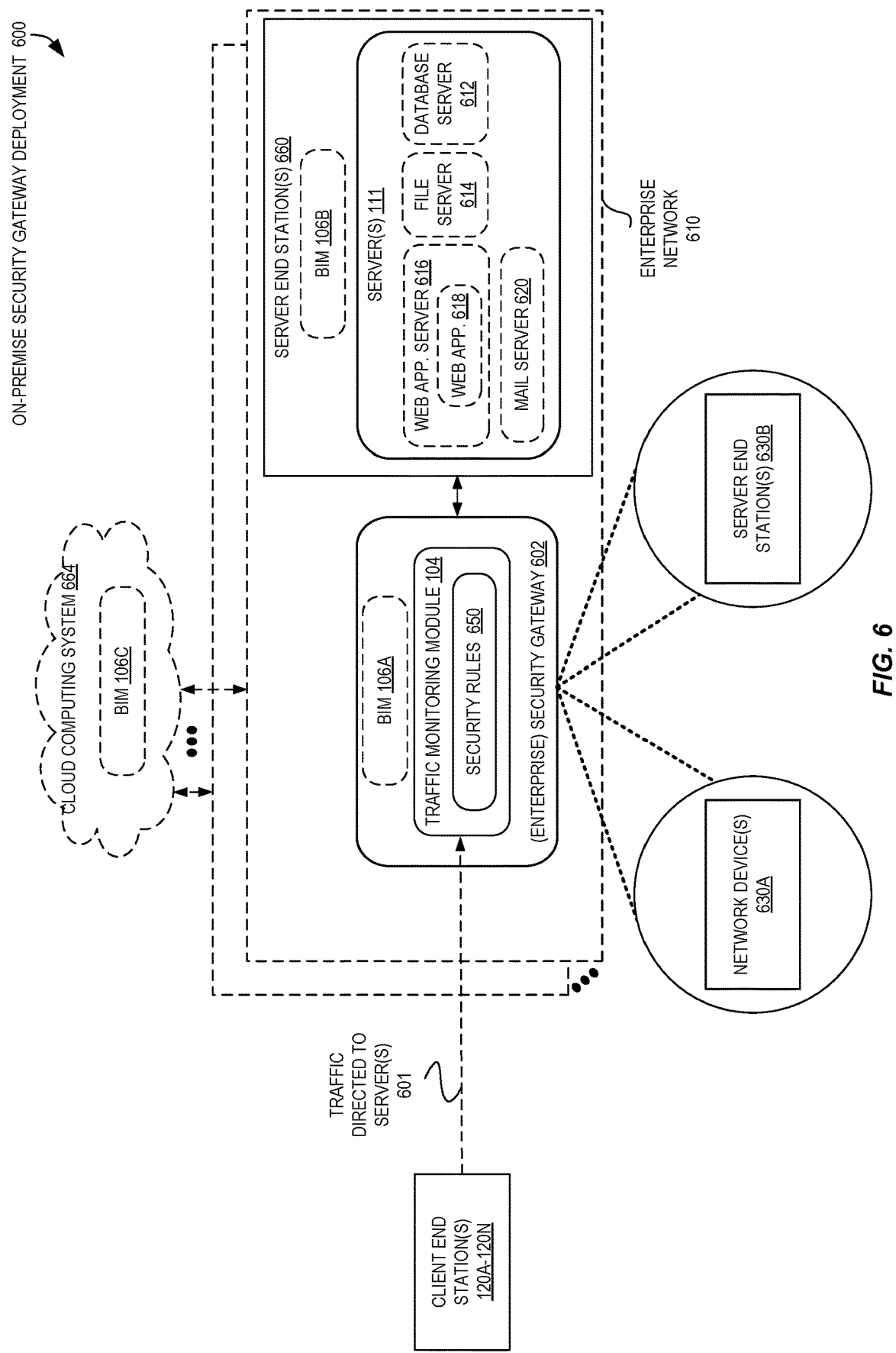
FIG. 6 is a block diagram illustrating an exemplary on premise deployment environment for a traffic monitoring module and/or botnet identification module according to some embodiments.

Specifically, FIG. 6 illustrates the TMM 104 implemented in a security gateway 602 (which can be an enterprise security gateway) coupled between servers 111 and client end stations 120A-120N. Thus, access to the servers 111 can be thought of as being "protected" by the security gateway 602, as most (or all) desired interactions with any of the servers 111 will flow through the security gateway 602.

Security gateways—such as firewalls, database firewalls, file system firewalls, and web application firewalls (WAFs)—are network security systems that protect software applications (e.g., web application servers 616) executing on electronic devices (e.g., server end stations 660) within a network (e.g., enterprise network 610) by controlling the flow of network traffic passing through the security gateway. By analyzing packets flowing through the security gateway and determining whether those packets should be allowed to continue traveling through the network, the security gateway can prevent malicious traffic from reaching a protected server, modify the malicious traffic, and/or create an alert to trigger another responsive event or notify a user of the detection of the malicious traffic.

In some embodiments, the security gateway 602 is communicatively coupled between the client end stations (120A-120N) and the server end stations 660, such that all traffic (or a defined subset of traffic) destined to the server end stations 660 is first passed through (or made available to) the security gateway 602 for analysis. In some embodiments, part of the analysis is performed by the TMM 104 based upon one or more configured security rules 650.

In some embodiments, the security gateway 602 executes as part of a separate server end station 630B or a (dedicated or shared) network device 630A; but in other embodiments, the security gateway 602 can operate as part of server end stations 660 (for example, as a software module), or can be implemented using or another type of electronic device and can be software, hardware, or a combination of both.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

Security gateways are sometimes deployed as transparent inline bridges, routers, or transparent proxies. A security gateway deployed as a transparent inline bridge, transparent router, or transparent proxy is placed inline between clients (the originating client end station of the traffic 601) and servers (e.g., server(s) 111) and is "transparent" to both the clients and servers (the clients and the servers are not aware of the IP address of the security gateway, and thus the security gateway is not an apparent endpoint). Thus, packets sent between the clients and the servers will pass through the security gateway (e.g., arrive at the security gateway, be analyzed by the security gateway, and may be blocked or forwarded on to the server when the packets are deemed acceptable by the security gateway).

Additionally, security gateways can also be deployed as a reverse proxy or non-inline sniffer (which may be coupled to a switch or other network device forwarding network traffic between the client end stations (120A-120N) and the server end stations 660).

In this depicted embodiment, the security gateway 602 and the server end station(s) 660 are illustrated as being within an enterprise network 610, which can include one or more LANs. An enterprise is a business, organization, governmental body, or other collective body utilizing or providing content and/or services.

In FIG. 6, a set of one or more server end stations 660 execute or otherwise implement one or more servers providing the content and/or services. In the embodiment depicted in this figure, the servers 111 include a database server 612, a file server 614, a web application server 616, and a mail server 620, though in other embodiments the set of server end stations 660 implement other types of servers, including but not limited to print servers, gaming servers, application servers, etc.

A web application server 616 is system software (running on top of an operating system) executed by server hardware (e.g., server end stations 660) upon which web applications (e.g., web application 618) run. Web application servers 616 may include a web server (e.g. Apache, Microsoft® Internet Information Server (IIS), nginx, lighttpd) that delivers web pages (or other content) upon the request of HTTP clients (i.e., software executing on an end station) using the HTTP protocol. Web application servers 616 can also include an application server that executes procedures (i.e., programs, routines, scripts) of a web application 618. Web application servers 616 typically include web server connectors, computer programming language libraries, runtime libraries, database connectors, and/or the administration code needed to deploy, configure, manage, and connect these components. Web applications 618 are computer software applications made up of one or more files including computer code that run on top of web application servers 616 and are written in a language the web application server 616 supports. Web applications 618 are typically designed to interact with HTTP clients by dynamically generating HyperText Markup Language (HTML) and other content responsive to HTTP request messages sent by those HTTP clients. HTTP clients (e.g., non-illustrated software of any of client end stations 120A-120N) typically interact with web applications by transmitting HTTP request messages to web application servers 616, which execute portions of web applications 618 and return web application data in the form of HTTP response messages back to the HTTP clients, where the web application data can be rendered using a web browser. Thus, HTTP functions as a request-response protocol in a client-server computing model, where the web application servers 616 typically act as the "server" and the HTTP clients typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http/https/ftp), a colon, two slashes, and one or more of user credentials, server name, domain name, IP address, port, resource path, query string, and fragment identifier, which may be separated by periods and/or slashes. The original versions of HTTP—HTTP/0.9 and HTTP/1.0—were revised in Internet Engineering Task Force (IETF) Request for Comments (RFC) 2616 as HTTP/1.1, which is in common use today. A new version of the HTTP protocol, HTTP/2, is based upon the SPDY protocol and improves how transmitted data is framed and transported between clients and servers.

Database servers 612 are computer programs that provide database services to other computer programs or computers, typically adhering to the client-server model of communication. Many web applications 618 utilize database servers 612 (e.g., relational databases such as PostgreSQL, MySQL, and Oracle, and non-relational databases, also known as NoSQL databases, such as MongoDB, Riak, CouchDB, Apache Cassandra, and HBase) to store information received from HTTP clients and/or information to be displayed to HTTP clients. However, other non-web applications may also utilize database servers 612, including but not limited to accounting software, other business software, or research software. Further, some applications allow for users to perform ad-hoc or defined queries (often using Structured Query Language or "SQL") using the database server 612. Database servers 612 typically store data using one or more databases, each including one or more tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column. Thus, in some instances a database server 612 can receive a SQL query from a client (directly from a client process or client end station using a database protocol, or indirectly via a web application server that a client is interacting with), execute the SQL query using data stored in the set of one or more database tables of one or more of the databases, and may potentially return a result (e.g., an indication of success, a value, one or more tuples, etc.).

A file server 614 is system software (e.g., running on top of an operating system, or as part of an operating system itself) typically executed by one or more server end stations 660 (each coupled to or including one or more storage devices) that allows applications or client end stations access to a file-system and/or files (e.g., enterprise data), typically allowing for the opening of files, reading of files, writing to files, and/or closing of files over a network. Further, while some file servers 614 provide file-level access to storage, other file servers 614 may provide block-level access to storage. File servers 614 typically operate using any number of remote file-system access protocols, which allow client processes to access and/or manipulate remote files from across the Internet or within a same enterprise network (e.g., a corporate Intranet). Examples of remote file-system access protocols include, but are not limited to, Network File System (NFS), WebNFS, Server Message Block (SMB)/Common Internet File System (CIFS), File Transfer Protocol (FTP), Web Distributed Authoring and Versioning (WebDAV), Apple Filing Protocol (AFP), Remote File System (RFS), etc. Another type of remote-file system access protocol is provided by Microsoft Sharepoint™, which is a web application platform providing content management and document and file management.

A mail server 620 (or messaging server, message transfer agent, mail relay, etc.) is system software (running on top of an operating system) executed by server hardware (e.g., server end stations 660) that can transfer electronic messages (e.g., electronic mail) from one computing device to another using a client-server application architecture. Many mail servers 620 may implement and utilize the Simple Mail Transfer Protocol (SMTP), and may utilize the Post Office Protocol (POP3) and/or the Internet Message Access Protocol (IMAP), although many proprietary systems also exist. Many mail servers 620 also offer a web interface (e.g., as a web application 618) for reading and sending email.

The illustrated exemplary deployment also illustrates a variety of configurations for implementing a BIM 106. A first deployment possibility (BIM 106A) is as a module of the security gateway 602. Another deployment possibility (BIM 106B) is as a module executed upon the server end station(s) 660, while yet another deployment possibility (BIM 106C) is a module executed in a cloud computing system 664. In some embodiments, the BIM 106 is communicatively coupled with the TMM 104, and thus can be located in a variety of locations able to provide such connectivity.

Figure 7:
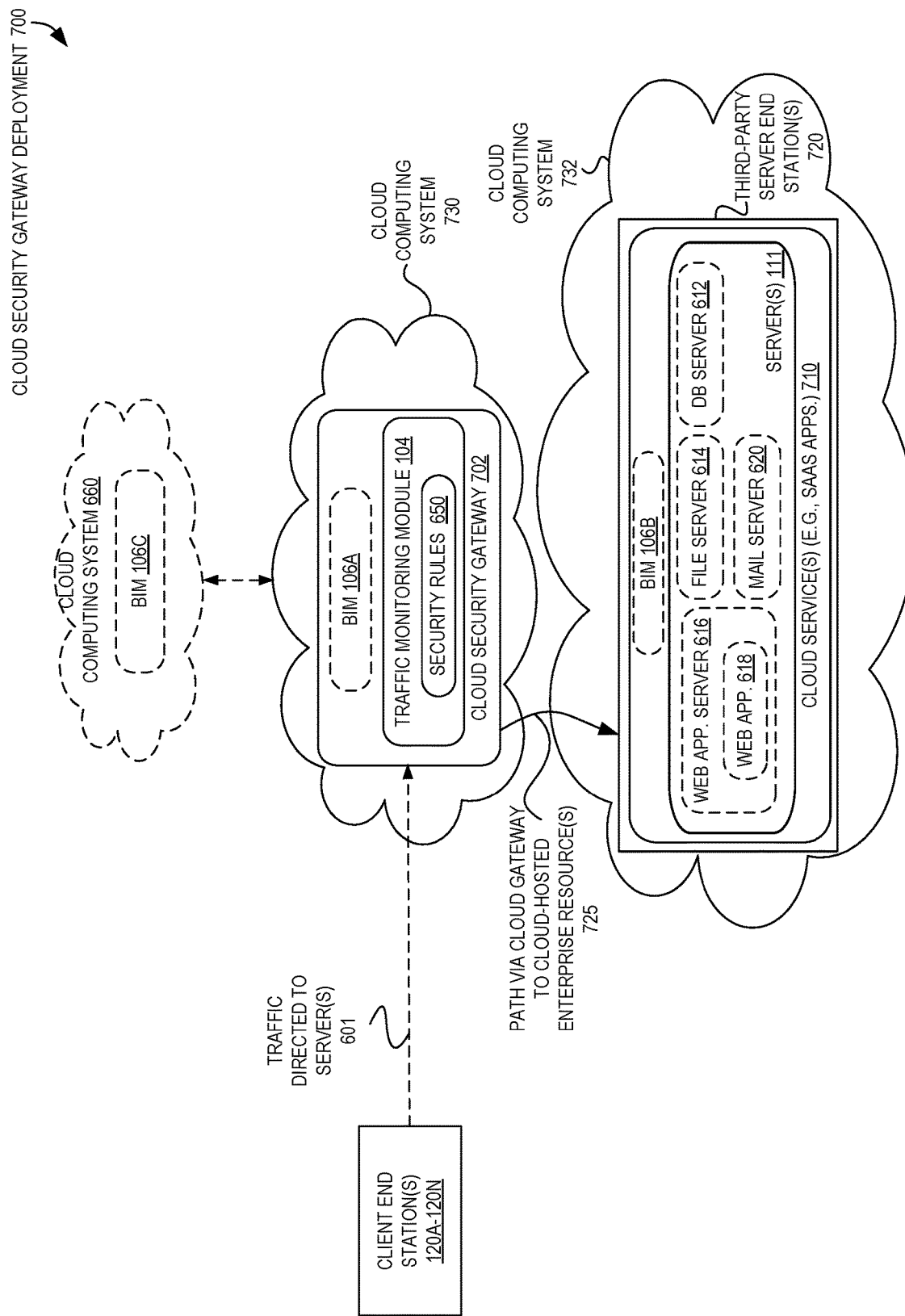
FIG. 7 is a block diagram illustrating an exemplary cloud-based deployment environment for a traffic monitoring module and/or botnet identification module according to some embodiments.

Another deployment possibility is illustrated in FIG. 7, which is a block diagram illustrating an exemplary cloud-based deployment environment 700 for a TMM and/or BIM according to some embodiments.

FIG. 7 again illustrates servers 111, a TMM 104, various deployments of a BIM 106, and client end station(s) 120A-120N. However, in this depicted embodiment, the servers 111 (and possibly BIM 106B) can be provided as cloud services 710 of one or more third-party server end stations 720 of, for example, a cloud computing system 732.

Additionally, the TMM 104 (and possibly BIM 106A) can be provided in a cloud security gateway 702 operating in a cloud computing system 730, which can be different than cloud computing system 732 or possibly even the same. Regardless, the path 725 from the client end station(s) 120A-120N to the servers 111 necessarily flows through the TMM 104, even though it may not be in a same cloud computing system 732 as the servers 111. One example of a cloud security gateway 702 is the Imperva™ Skyfence™ Cloud Gateway from Imperva, Inc.

Alternatively, though not illustrated, the TMM 104 may not lie in the path 725 between the client end stations 120A-120N and the servers 111, and instead may gain access to network traffic through a channel between the TMM 104 and the servers 111 for this purpose. For example, the TMM 104 can be configured to "monitor" or "poll" the cloud service(s) 710 by transmitting requests to the third-party server end stations (or individual servers, such as web application server 616) as part of a monitoring scheme to obtain network traffic. This monitoring can occur according to a defined schedule, such as checking once every few minutes. Additionally or alternatively, the server(s) 111 can be configured to "report" some or all traffic (or summaries thereof, event data structures, etc.) to the TMM 104. For example, in some embodiments the server(s) 111 can be configured to transmit data to the TMM 104 using an Application Programming Interface (API) call, Short Message Service (SMS) message, email message, etc.

Figure 8:
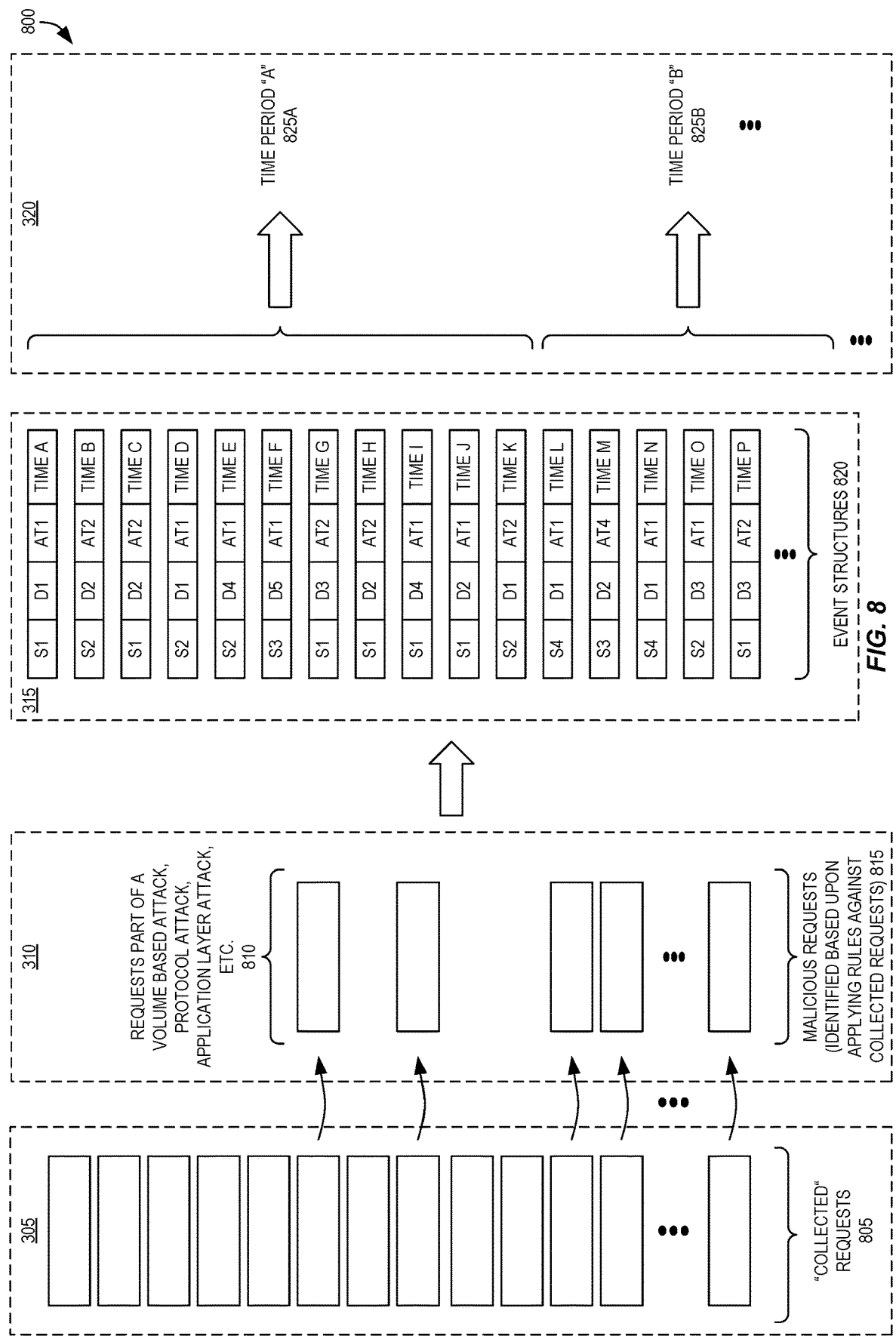
Figure 9:
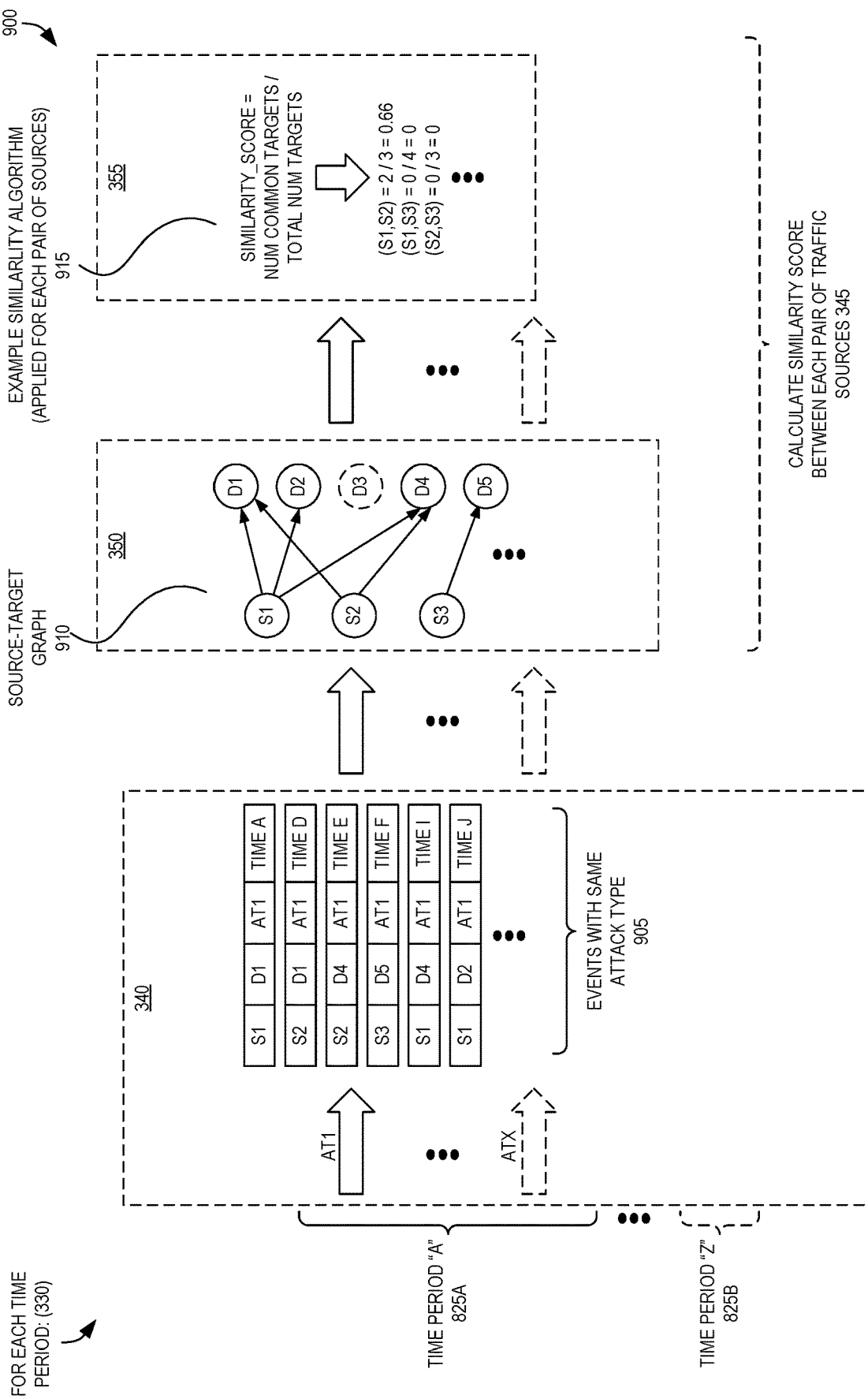
Figure 10:
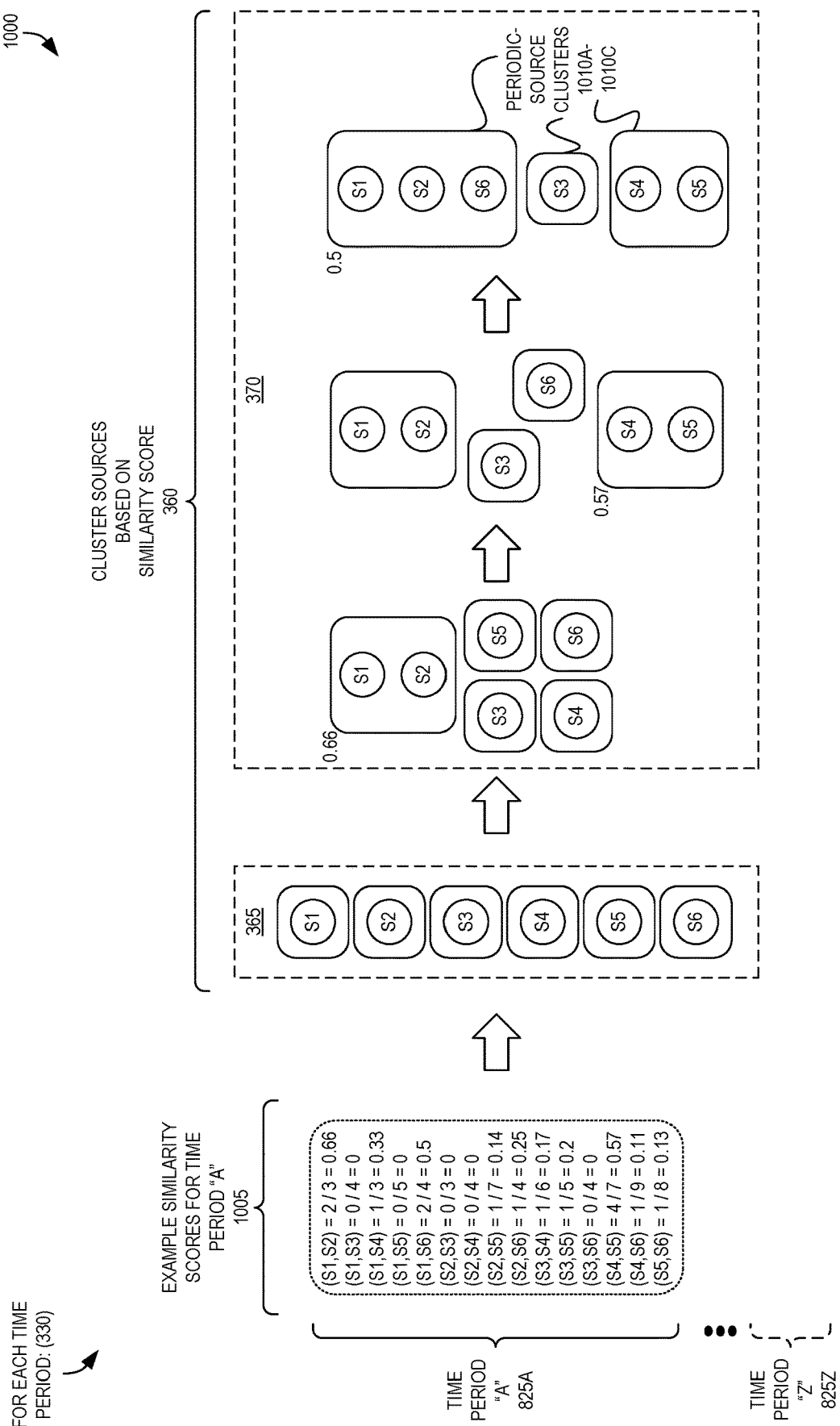
Figure 11:
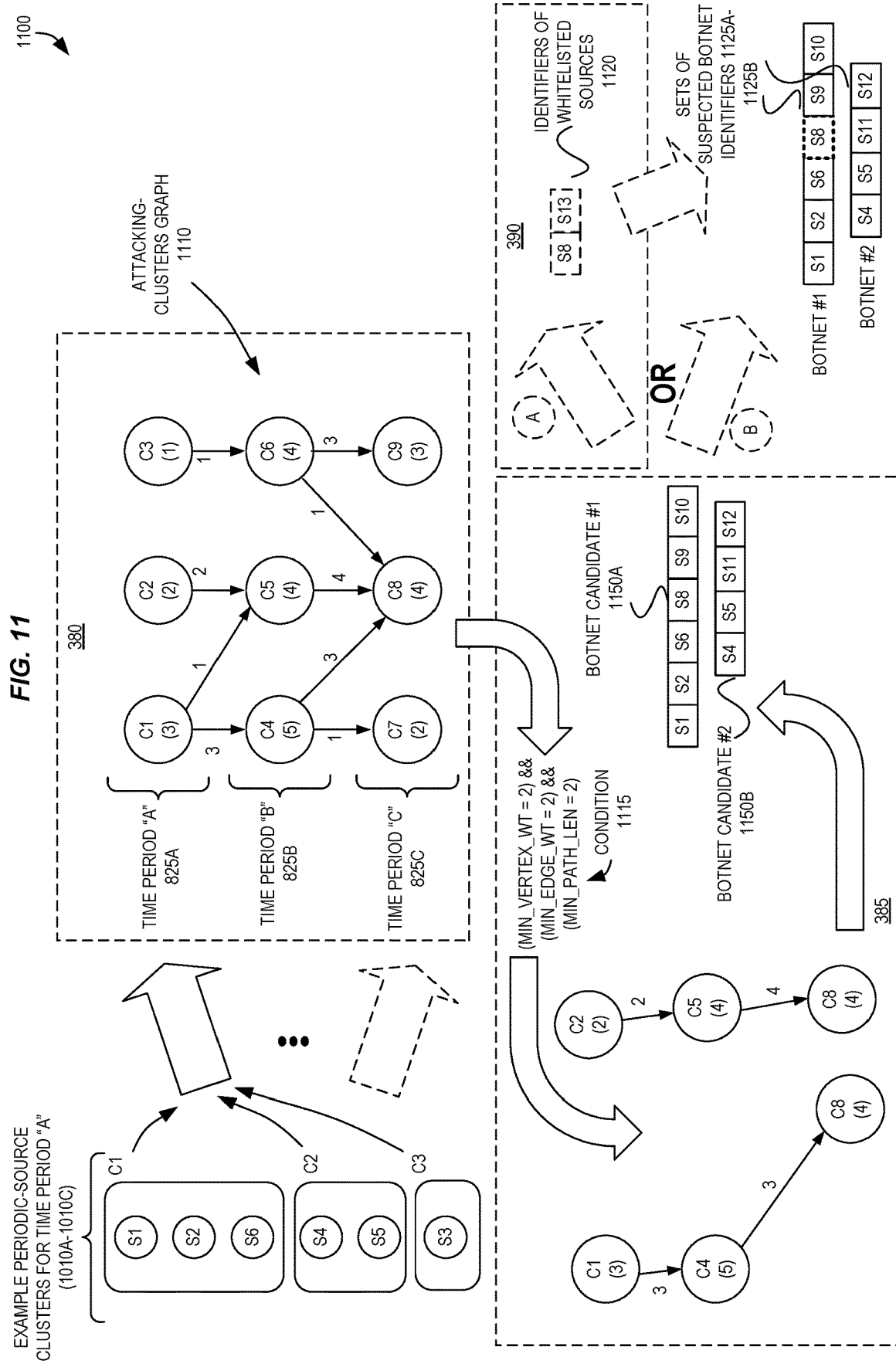

FIG. 8 is a block diagram illustrating exemplary operations 800 including malicious event identification for botnet member identification according to some embodiments. The operations depicted in FIG. 8 and subsequent FIGS. 9-11 are provided to further illustrate one possible set of operations corresponding to certain operations depicted in FIG. 3 and/or FIG. 4. In some embodiments, these operations of any or all of FIGS. 8-11 can be performed by the BIM 106 of FIG. 1, 6, or 7.

In some embodiments, a botnet member identification procedure can include obtaining a set of requests 805 originated by one or more end stations (e.g., client end stations, server end stations) and destined to one or more servers (e.g., servers 111). As described herein, this obtaining could include receiving traffic data 108 from one or more TMMs 104 (e.g., as each request is received, according to a schedule, on-demand, etc.), and these one or more TMMs 104 could be at a same or different site—for example, the traffic data 108 could be from one organization or from multiple organizations. As another example, the obtaining of the set of requests 805 could occur via obtaining, by the BIM 106, data from access logs of the server(s) 111, and identifying requests 805 from within this data. For example, the BIM 106 could request access log data from the server(s) 111 (or server end station(s) 110) and then it would be transmitted back to the BIM 106 in response, or the server(s) 111/server end station(s) 110 could otherwise provide the access log data, e.g., according to a schedule. Then, according to the type of server 111 and/or the type of logs, requests can be identified. This set of operations for obtaining or "collecting" the set of requests 805 can, in some embodiments, be part of block 305 of FIG. 3—i.e., observing incoming requests to one or more web applications at one or more sites for an amount of time.

Next, from the collected requests 805, a set of malicious requests 815 can be identified based upon applying a set of security rules to the set of collected requests 805. Numerous types of security rules for detecting malicious attacks are well-known to those of skill in the art and can be used in various embodiments, and may include searching for the existence (or non-existence) of a particular character, set of characters, pattern, etc., within one or multiple portions (e.g., within headers and/or payloads) of one or multiple requests.

As one example, a rule can be configured to detect a "malformed" Content-Length header (of a HTTP request message) that has a negative value, as one attack that has been observed includes attackers providing negative values in this field instead of an anticipated, non-negative integer value. Thus, one or more of the collected requests 805 can be analyzed to determine if any include a negative integer value (or another type of non-anticipated type of value), and if such a request is found, it can be included in the set of malicious requests 815. In various embodiments the number of rules and/or attack "coverage" of the set of rules can differ according to the types of server(s) involved, the amount of scrutiny required for the deployment, the amount of processing resources available, etc. Thus, in some embodiments, the malicious requests 815 could include requests 810 that are part of a volumetric (or "volume-based") attack, protocol attack, application layer attack, etc.

In some embodiments, this set of operations for identifying malicious requests 815 may be part of block 310 of FIG. 3—i.e., identifying a subset of the observed incoming requests 805 as being part of a malicious attack.

For each of the malicious requests 815, an event structure 820 can be generated. As illustrated, each event structure 820 includes a source identifier (S1, S2, et seq.) of the source of the corresponding request message, which can comprise a complete or partial source Internet Protocol (IP) address (v4 or v6), or another identifier that uniquely corresponds to a particular source. FIG. 8 also shows each event structure 820 including a destination identifier (D1, D2, et seq.) of the destination (e.g., server) of the corresponding request message, which can comprise a complete or partial source Internet Protocol (IP) address (v4 or v6), a hostname, or another identifier that uniquely corresponds to a particular destination. Each event structure 820 illustrated also includes an attack type indicator (AT1, AT2, et seq.) that uniquely identifies one (or more) attack type of the corresponding request message. As one simple example, upon the security rule described above (looking for a negative integer in a Content-Length header) being met, an identifier of that particular rule (e.g., rule #1) or attack (e.g., a Malformed Content-Length attack, which could be found via one or more multiple rules, is attack #3) can be placed within the event structure 820. Additionally, the depicted event structures 820 also include a time (TIME A, TIME B, et seq.) associated with the request—e.g., the time when the request was received/observed/logged by a TMM 105, security gateway 102, server end station 110, server 111, etc. This time could be in a variety of formats/representations, including a raw or converted timestamp, an identifier of a period of time (which hour, 10 minute window, etc.) of the request, etc.

Although four types of data are shown within an event structure 820 and will be used to continue the example, it is to be understood that the number(s) and type(s) of these elements can be different in different embodiments—thus, this combination is merely exemplary.

In some embodiments, this set of operations for generating event structures 820 may be part of block 315 of FIG. 3—i.e., creating, for each of the identified malicious requests, an event data structure.

In some embodiments, the event structures 820 can be divided into time periods (e.g., time period 'A' 825A, time period 'B' 825B, and so on). The size of the time period can be configured differently depending upon the preferences of the implementer and the types of attacks currently used by attackers, and can be tuned over time to adjust for best results for a particular implementation. However, in general, the size of each time period should be large enough to allow for evidence of an ongoing, continued attack to be observed in successive time periods, though the size of each time period should be small enough to avoid the processing (described below) for each time period becoming impractical. For example, in some embodiments, the size of each time period is one minute, though in other embodiments the size of each time period could be thirty seconds, two minutes, five minutes, ten minutes, thirty minutes, one hour, etc.

This "division" of the event structures 820 into multiple time periods 825 can occur as a distinct operation, and can include placing those event structures in a same time period in a memory or storage location in adjacent physical or virtual locations. However, in some embodiments, the division of the event structures 820 may include labeling (or updating) each event structure 820 with a time period identifier, and in some embodiments, the division may occur iteratively—e.g., the event structures can be iterated over one or more multiple times to gather time period-relevant event structures in an on-demand fashion. For example, in some embodiments each event structure can be a record/document stored a database, and the division can occur by querying the database for event structures having a "time" within a range of times corresponding to a particular time period. Of course, many other techniques for dividing event structures into time periods can be utilized and discerned by those of ordinary skill in the art.

In some embodiments, this set of operations for dividing event structures into time periods may be part of block 320 of FIG. 3—i.e., the events are split into separate time period groupings based upon the time of each event.

We now turn to FIG. 9, which is a block diagram illustrating exemplary operations 900 including traffic source similarity determination for botnet member identification, which can be performed after the operations of FIG. 8, according to some embodiments.

These depicted operations 900 can be performed for each of the time periods in which the event structures have been divided into, as shown in FIG. 8, which can correspond to block 330 of FIG. 3.

Thus, in some embodiments, the event structures (corresponding to "events") of a time period having a same attack type 905 can be identified, which can correspond to block 340 of FIG. 3—i.e., events of a same attack type are selected. This selection can, in some embodiments, be based upon the attack type indicator data of each event structure (shown here as "AT1").

Using these selected events having a same attack type, in some embodiments a source-target graph 910 can be constructed, which can be a graph of the sources (of the traffic) connected to the targets (or destinations of the traffic). In this depicted example, the events with an attack type 905 of "AT1" have three different sources—S1, S2, and S3—and these events have four different targets—D1, D2, D4, and D5. Thus, in some embodiments a vertex (or node) is created for each traffic source and a vertex is created for each traffic target/destination, and edges (or "arrows", which can be directed) can be inserted between those of the sources and targets that have a corresponding event with a same attack type 905. In this example, as there are three events of a same attack type 905 from source S1, and these events are destined to targets D1, D4, and D2, the source-target graph 910 includes three edges leading from S1 to D1, D2, and D4, respectively. In some embodiments, these source-target graph 910 construction operations may be part of block 350 of FIG. 3—i.e., representing selected events as a graph of sources connected to targets.

With this source-target graph 910, in some embodiments a similarity algorithm 915 can be applied (or executed) to determine the similarity between the source vertices of the graph. A variety of such similarity algorithms are known to those of skill in the art, and one such similarly algorithm is illustrated here in FIG. 9. This exemplary similarity algorithm 915 includes determining a similarity score for each pair of sources in the graph 910, and includes dividing the number of common targets (for a considered pair of sources) and the total number of different targets (for the same considered pair of sources). Thus, in this example, the similarity score for S1 and S2 can be the result of 2 (as sources S1 and S2 both are connected to targets D1 and D4) divided by 3 (as sources S1 and S2 collectively target D1, D2, and D4). This result of ⅔ yields a similarity score of 0.66 for the (S1, S2) pair. In some embodiments, a similarity score can be computed for each such combination of sources. These operations involving applying a similarity algorithm can be part of block 355 of FIG. 3—i.e., applying a similarity algorithm for the vertices' similarity based upon the graph.

This combination of source-target graph 910 construction and similarity scoring (e.g., using similarity algorithm 915) can be part of block 345 of FIG. 3, and can be performed for each of the different groupings of events having a same attack type 905, and can be performed for each time period (e.g., time periods 825A-825B) being considered.

Continuing on, FIG. 10 is a block diagram illustrating exemplary operations 1000 including periodic-source cluster generation for botnet member identification, which can be performed after the operations of FIG. 9, according to some embodiments. Using the generated similarity scores (e.g., example similarity scores 1005)—for a time period for a grouping of event structures having a same attack type—the sources can be clustered 360. For example, in some embodiments each source reflected in the example similarity scores 1005 may be initially placed into its own cluster, which can be part of block 365 of FIG. 3—i.e., assigning each source to its own group or cluster.

Next, in some embodiments the sources can be iteratively combined (or consolidated) based upon the similarity scores, which can be part of block 370 of FIG. 3. For example, the pair of sources having a largest similarity score can be combined. This combining can occur one or more times while one or more conditions are met. For example, in some embodiments the combining occurs as long as the next-highest similarity score is greater than a threshold value (e.g., 0.5).

For ease of understanding, the exemplary six sources in FIG. 10 may first be placed into separate clusters (which can correspond to block 365 of FIG. 3), and the source pair having the largest unprocessed similarity score (of 0.66, belonging to the S1-S2 pair) can be merged into one cluster. This results in one cluster with S1 and S2, and four other clusters corresponding to S3-S6. Next, the next source pair having the largest unprocessed similarity score (of 0.57, belonging to the S4-S5 pair) can be merged into one cluster. This results in four clusters—(S1,S2), (S3), (S6), and (S4, S5). Again, the next source pair having the largest unprocessed similarity score (of 0.5, belonging to the S1-S6 pair) can be merged into one cluster. In this case, the source S6 can be added into the cluster including S1 and S2, and thus, three clusters remain—(S1, S2, S6), (S3), and (S4, S5).

Although the next source pair having the largest unprocessed similarity score (0.33, of the S1-S4 pair) could be merged, in this example we assume that a merging condition exists, which indicates that merging will only occur for similarity scores that are greater than or equal to 0.5. Thus, because 0.33 does not satisfy this criteria as it is less than 0.5, the merging stops, leaving a set of periodic-source clusters 1010A-1010C. Of course, other rules can be configured for this merging process, and thus, this illustrated scenario is exemplary. For example, rules can be utilized that indicate what happens when a source (in a cluster with 1+ other sources) is to be merged with another source (in a different cluster with 1+ other sources), which could include merging all of these sources together into one cluster, stopping the merging process, skipping that particular merge but continuing the merging process, etc.

We continue with FIG. 11, which is a block diagram illustrating exemplary operations 1100 including attacking-clusters graph generation and botnet identification for botnet member identification, which can be performed after the operations of FIG. 10, according to some embodiments.

With a set of periodic-source clusters (e.g., periodic-source clusters 1010A-1010C generated in FIG. 10, shown as C1, C2, and C3) corresponding to events of a same attack type from each of the time periods under consideration, an attacking-clusters graph 1110 can be generated. This generation can be part of block 380 of FIG. 3. For example, the periodic-source clusters 1010A-1010C of time period "A" 825A can be represented as a level in a graph, where each vertex represents one of the clusters and has a weight indicating the number of sources within the cluster. As an example, the first periodic-source cluster 1010A includes three sources (S1, S2, and S6), and thus can be represented as a vertex "C1" having a weight of 3. Each of the other periodic-source clusters 1010B-1010C can similarly be represented as vertices C2 and C3, having weights of 2 and 1 respectively. This attacking-clusters graph 1110 construction can continue with generating additional levels for each other time period under consideration—here, this is shown as time periods 'B' 825B and 'C' 825C, though of course in other embodiments there can be different numbers of time periods.

The attacking-clusters graph 1110 construction can also include the insertion of edges between the vertices of different levels. For example, an edge can be inserted between clusters of adjacent levels that share members (i.e., have one or more common sources). In this example, we assume that cluster C1 (having S1, S2, and S6) shares all three of its sources with cluster C4 of the second level (which, for example, could represent sources S1, S2, S6, S8, S9, and S10). Thus, an edge can be inserted between C1 and C4, with a weight indicating a number of common sources (3) between the two vertices.

In some embodiments, with a per-attack-type attacking-clusters graph 1110, the operations 1100 can further include analyzing the attacking-clusters graph 1110 according to a condition 1115. In some embodiments, a condition 1115 comprises one or more logical tests indicating what paths through the attacking-clusters graph 1110 are to be identified. For example, the condition 1115 shown herein provides that path are to be identified that include only vertices having a weight of 2 or more, only edges having a weight of 2 or more, and have a path length (e.g., a number of traversed edges) of at least 2 edges. In this case, the condition 1115 is satisfied for two paths of the attacking-clusters graph 1110: C1-C4-C8 and C2-C5-C8. These two paths can thus indicate two botnet candidates, which are represented as botnet candidate #1 1150A and botnet candidate #2 1150B. Each botnet candidate 1150A-1150B is shown as including identifiers of the sources of the vertices traversed in the corresponding path. Thus, this set of operations involving utilizing a condition 1115 with the attacking-clusters graph 1110 to generate botnet candidates can be part of block 385 of FIG. 3—i.e., finding all paths that contain only edges with a minimal weight, that pass through vertices with a minimal weight, and have a length larger than a threshold amount of edges, resulting in each path being a botnet "candidate" (in some embodiments, subject to further processing).

For example, in some embodiments, the operations 1100 may include, at circle 'A', removing from the botnet candidates 1150A-1150B any sources (or, source identifiers) that exist in a set of identifiers of whitelisted sources 1120 (e.g., sources known to be part of CDNs, search engines, scanning services). As illustrated, the sources S8 and S13 are in the set of identifiers of whitelisted sources, and source S8 is also within botnet candidate #1 1150A. Thus, this source may be remove from botnet candidate #1 1150A whereas botnet candidate #2 will be unchanged, resulting in the two sets of suspected botnet identifiers 1125A-1125B. These operations for the "filtering" of whitelisted sources may be part of block 390 of FIG. 3—i.e., sources can be removed from the paths that belong to a list of whitelisted sources. However, in some embodiments such source removal operations may not be performed, and thus the flow may alternatively continue via circle 'B' to yield the two sets of suspected botnet identifiers 1125A-1125B, where the first botnet #1 1125A does include an identifier of source S8.

Exemplary Flows

Figure 12:
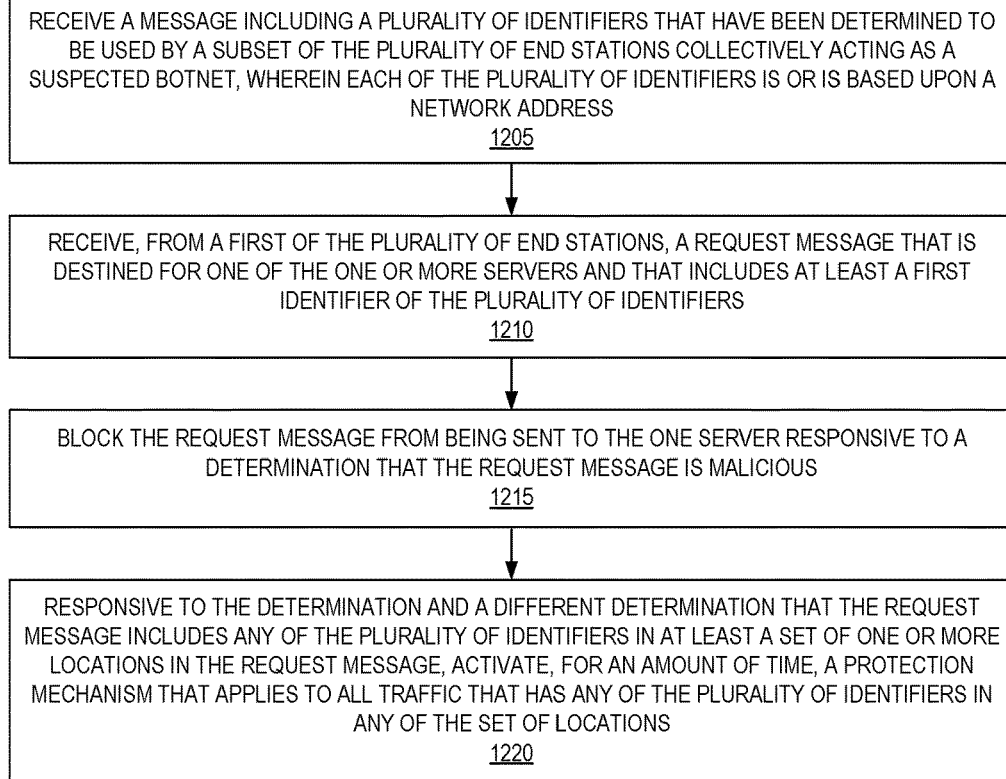
FIG. 12 is a flow diagram illustrating exemplary operations for providing targeted botnet protection according to some embodiments.

FIG. 12 is a flow diagram illustrating exemplary operations 1200 for providing targeted botnet protection according to some embodiments. In some embodiments, operations 1200 can be performed by one or more TMMs 104 disclosed herein. In these embodiments, the one or more TMMs 104 can be implemented by one or more electronic devices, and each TMM 104 can be deployed in front of the one or more servers in that the TMM 104 receives all network traffic sent by a plurality of end stations that is destined for the one or more servers.

In some embodiments, at block 1205 the operations 1200 include receiving a message including a plurality of identifiers that have been determined to be used by a subset of the plurality of end stations collectively acting as a suspected botnet, where each of the plurality of identifiers is or is based upon a network address. The operations 1200 can also include, at block 1210, receiving, from a first of the plurality of end stations, a request message that is destined for one of the one or more servers and that includes at least a first identifier of the plurality of identifiers. The operations 1200 can also include, at block 1215, blocking the request message from being sent to the one server responsive to a determination that the request message is malicious, and at block 1220, responsive to the determination and a different determination that the request message includes any of the plurality of identifiers in at least a set of one or more locations in the request message, activating, for an amount of time, a protection mechanism that applies to all traffic that has any of the plurality of identifiers in any of the set of locations.

In some embodiments, the set of locations includes one or more of: a source IP address header field; a User-Agent header field; and an X-Forwarded-For header field.

In some embodiments, the protection mechanism comprises dropping all traffic that has any of the plurality of identifiers in any of the set of locations regardless of whether it is separately determined to be malicious. In some embodiments, the operations 1200 further include receiving a second request message that is from the first end station and that is destined to any one of the one or more servers; and allowing the second request message to be forwarded toward its destination despite the second request message including the at least one of the plurality of identifiers that have been determined to be used by the subset of end stations collectively acting as the suspected botnet due to the protection mechanism no longer being activated.

In some embodiments, the protection mechanism comprises increasing an amount of security analysis performed with the traffic that has any of the plurality of identifiers in any of the set of locations.

According to some embodiments, the amount of time that the protection mechanism is activated is specific to the suspected botnet. In some embodiments, the amount of time is based upon an average or maximum attack length of time determined based upon previous activity of the suspected botnet.

In some embodiments, the amount of time is indefinite in that it continues until a condition is satisfied. In some embodiments, the condition is satisfied upon a determination that no request messages have been received (e.g., at the TMM 104) that include any of the plurality of identifiers in any of the set of locations for a threshold amount of time.

In some embodiments, the operations 1200 further include receiving, from a second end station of the subset of end stations, a second request message that is destined for a second server of the one or more servers and that includes at least one of the plurality of identifiers in one of the set of locations; and blocking, as part of the protection mechanism before an end of the amount of time, the second request message from being sent to the second server due to the protection mechanism being activated.

According to some embodiments, the received message that includes the plurality of identifiers further includes a second plurality of identifiers that have been determined to be used by a second subset of the plurality of end stations collectively acting as a second suspected botnet; the first identifier exists in both the plurality of identifiers and the second plurality of identifiers; and the activated protection mechanism further applies to all traffic that has any of the second plurality of identifiers in any of the set of locations due to the first identifier also existing in the second plurality of identifiers.

In some embodiments, the operations 1200 further include receiving, from a second of the plurality of end stations, a second request message that is destined to any of the one or more servers and that includes at least a second identifier that exists within a second plurality of identifiers of a second suspected botnet but not within the first plurality of identifiers of the suspected botnet; and responsive at least in part due to the second identifier not existing within the first plurality of identifiers, allowing the second request message to be forwarded toward its destination despite the protection mechanism being activated for the suspected botnet and despite the second identifier belonging to the second plurality of identifiers of the second suspected botnet.

Figure 13:
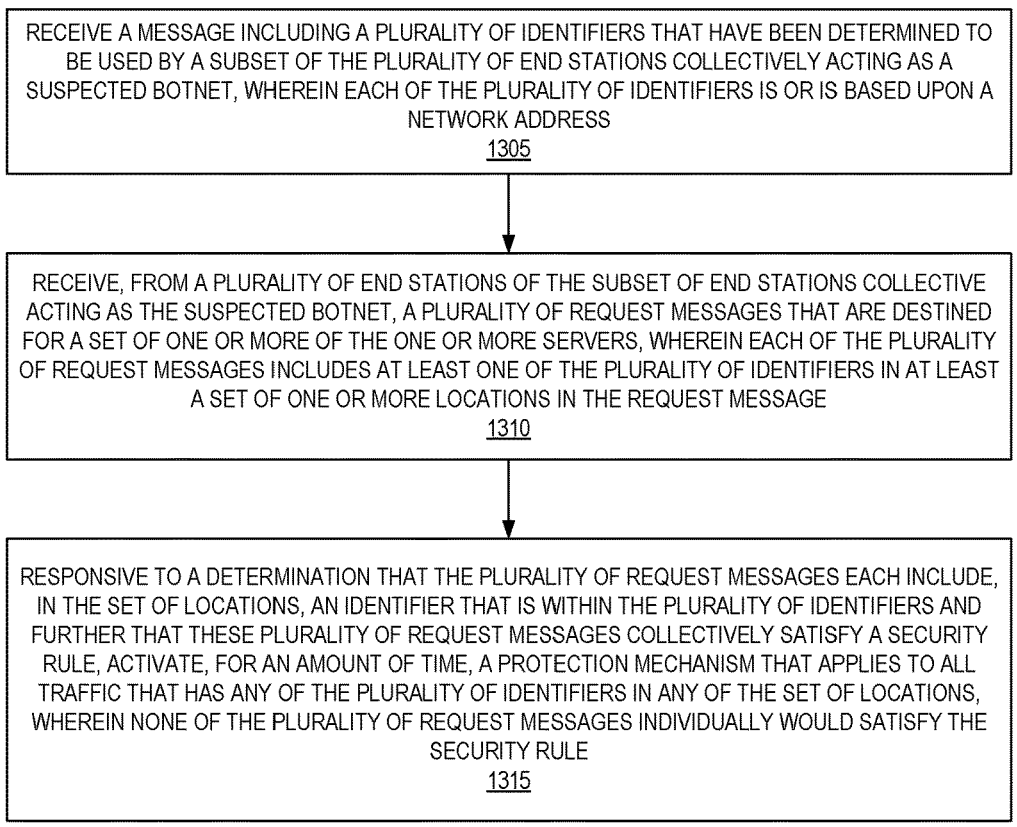
FIG. 13 is a flow diagram illustrating exemplary operations for providing targeted botnet protection according to some embodiments.

FIG. 13 is a flow diagram illustrating exemplary operations 1300 for providing targeted botnet protection according to some embodiments. In some embodiments, operations 1300 can be performed by one or more TMMs 104 disclosed herein. In these embodiments, the one or more TMMs 104 can be implemented by one or more electronic devices, and each TMM 104 can be deployed in front of the one or more servers in that the TMM 104 receives all network traffic sent by a plurality of end stations that is destined for the one or more servers.

In some embodiments, at block 1305 the operations 1300 include receiving a message including a plurality of identifiers that have been determined to be used by a subset of the plurality of end stations collectively acting as a suspected botnet, wherein each of the plurality of identifiers is or is based upon a network address.

In some embodiments, the operations 1300 include, at block 1310, receiving, from a plurality of end stations of the subset of end stations collective acting as the suspected botnet, a plurality of request messages that are destined for a set of one or more of the one or more servers, wherein each of the plurality of request messages includes at least one of the plurality of identifiers in at least a set of one or more locations in the request message.

In some embodiments, the operations 1300 include, at block 1315, responsive to a determination that the plurality of request messages each include, in the set of locations, an identifier that is within the plurality of identifiers and further that these plurality of request messages collectively satisfy a security rule, activating, for an amount of time, a protection mechanism that applies to all traffic that has any of the plurality of identifiers in any of the set of locations, wherein none of the plurality of request messages individually would satisfy the security rule.

In some embodiments, the security rule, to be satisfied, at least requires a defined amount of request messages that share a common characteristic to be received within a period of time, wherein the defined amount of request messages is greater than one. According to some embodiments, the common characteristic is met when each of the plurality of request messages carries a payload representing an attempt to login to an application, wherein the payload includes a password, a username, or both the password and username. In some embodiments, the operations 1300 further include determining that each attempt to login of each of the plurality of request messages was unsuccessful. In some embodiments, said determining that each attempt to login of the plurality of request messages was unsuccessful comprises: receiving a plurality of response messages that were originated by the set of servers, wherein each response message indicates that the attempt to login of a corresponding one of the plurality of request messages was unsuccessful.

According to some embodiments, the set of locations includes one or more of: a source IP address header field; a User-Agent header field; and an X-Forwarded-For header field.

According to some embodiments, the protection mechanism comprises dropping all traffic that has any of the plurality of identifiers in any of the set of locations regardless of whether it is separately determined to be malicious.

According to some embodiments, the protection mechanism comprises increasing an amount of security analysis performed with the traffic that has any of the plurality of identifiers in any of the set of locations.

According to some embodiments, the amount of time that the protection mechanism is activated is specific to the suspected botnet and is based upon an average or maximum attack length of time determined based upon previous activity of the suspected botnet.

According to some embodiments, the amount of time is indefinite in that it continues until a condition is satisfied, wherein the condition is satisfied upon a determination that no request messages have been received (e.g., at the TMM) that include any of the plurality of identifiers in any of the set of locations for a threshold amount of time.

FIG. 14 is a flow diagram illustrating exemplary operations 1400 for identifying a subset of a plurality of end stations that collectively act as a suspected botnet according to some embodiments. In some embodiments, operations 1400 can be performed by a BIM 106 disclosed herein. The BIM 106 can be implemented by an electronic device.

In some embodiments, the operations 1400 include, at block 1405, obtaining traffic data from one or more TMMs 104 implemented by one or more electronic devices, wherein the traffic data includes or is based upon a plurality of request messages that were originated by ones of the plurality of end stations and that were destined to one or more servers, wherein each of the one or more TMMs is deployed in front of at least one of the one or more servers in that the TMM receives all network traffic originated by the plurality of end stations that is destined for the at least one server;

In some embodiments, the operations 1400 include, at block 1410, generating, based upon the obtained traffic data, a set of identifiers corresponding to the subset of the plurality of end stations that are determined by the BIM to be collectively acting as the suspected botnet in that they have transmitted request messages, destined for one or more of the one or more servers, that collectively or individually satisfy one or more security rules which, when satisfied, indicate a malicious attack, wherein the set of identifiers comprises a plurality of identifiers.

In some embodiments, the operations 1400 include, at block 1415, transmitting the set of identifiers to the one or more TMMs to cause the one or more TMMs to utilize the set of identifiers while analyzing subsequent request messages destined to the one or more servers to detect an attack from the suspected botnet and to protect the one or more servers from the attack.

In some embodiments, said generating the set of identifiers comprises: identifying, from the traffic data, a subset of the plurality of request messages that are malicious; and determining, based upon the subset of request messages, that the subset of end stations have collectively performed the malicious attack for at least a threshold amount of time and that at least a threshold number of the subset of end stations have been involved in the malicious attack for each of a threshold number of time periods within the threshold amount of time.

In some embodiments, said determining comprises: generating a plurality of event data structures corresponding to the subset of request messages, wherein each of the plurality of event data structures includes a source identifier of a source of the corresponding request message and a destination identifier of a destination of the corresponding request message; identifying a plurality of groupings of the generated event data structures, wherein each of the plurality of groupings corresponds to a time period of a plurality of different time periods and includes those of the generated event data structures corresponding to a request message that was received at a corresponding one of the one or more TMMs within the time period; and identifying, for each of the different time periods, groupings of source identifiers of the request messages corresponding to the event data structures of the time period, wherein generating the set of identifiers is based upon analyzing the groupings of source identifiers of each of the different time periods.

In some embodiments, said identifying the groupings of source identifiers for each of the different time periods comprises: calculating a similarity score between each pair of source identifiers of those of the event data structures of the time period that have a same attack type, wherein the similarity score is based upon the destination identifiers of those event data structures that include one of the pair of source identifiers; and clustering, based upon the similarity scores, the source identifiers of those of the event data structures of the time period that have the same attack type.

In some embodiments, said generating the set of identifiers further comprises: removing, from the set of identifiers, any identifier existing within a set of whitelisted source identifiers.

In some embodiments, the operations 1400 further include determining, based at least in part upon the obtained traffic data, an attack duration of the suspected botnet, wherein the attack duration is an average attack duration or a maximum attack duration observed over a plurality of attacks observed from the suspected botnet; and transmitting the attack duration of the suspected botnet to the one or more TMMs to cause the one or more TMMs to utilize the attack duration while protecting the one or more servers from the suspected botnet.

In some embodiments, each identifier of the set of identifiers comprises an IP address.

ALTERNATIVE EMBODIMENTS

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a botnet identification module (BIM) that is implemented by an electronic device and that is for identifying a subset of a plurality of end stations that collectively act as a suspected botnet, the method comprising:

obtaining, by the BIM, traffic data from one or more traffic monitoring modules (TMMs) implemented by one or more electronic devices, wherein the traffic data includes or is based upon a plurality of request messages that were originated by ones of the plurality of end stations and that were destined to one or more servers, wherein each of the one or more TMMs is deployed in front of at least one of the one or more servers in that the TMM receives all network traffic originated by the plurality of end stations that is destined for the at least one server;

generating, by the BIM based upon the obtained traffic data, a set of identifiers corresponding to the subset of the plurality of end stations that are determined by the BIM to be collectively acting as the suspected botnet in that they have transmitted request messages, destined for one or more of the one or more servers, that collectively or individually satisfy one or more security rules which, when satisfied, indicate a malicious attack, wherein the set of identifiers comprises a plurality of identifiers, wherein said generating the set of identifiers comprises:

identifying, from the traffic data, a subset of the plurality of request messages that are malicious, generating an attacking-clusters graph based on the subset of request messages that is identified as being malicious, wherein the attacking-clusters graph includes vertices representing source clusters, wherein the attacking-clusters graph further includes edges between vertices in adjacent levels of the attacking-clusters graph, wherein an edge between vertices indicates that source clusters represented by those vertices share one or more common sources, wherein the vertices in the attacking-clusters graph are each assigned a weight representing a number of sources in a source cluster represented by that vertex, and wherein the edges in the attacking-clusters graph are each assigned a weight representing a number of common sources between source clusters represented by vertices connected by that edge, and determining, based upon analyzing the attacking-clusters graph, that the subset of end stations have collectively performed the malicious attack for at least a threshold number of consecutive time periods and that at least a threshold number of the subset of end stations have been involved in the malicious attack for each of the threshold number of consecutive time periods, wherein the analyzing includes finding paths in the attacking-clusters graph that only contain edges with a threshold weight, that only pass through vertices with a threshold weight, and that have a length longer than a threshold length; and transmitting, by the BIM, the set of identifiers to the one or more TMMs to cause the one or more TMMs to utilize the set of identifiers while analyzing subsequent request messages destined to the one or more servers to detect an attack from the suspected botnet and to protect the one or more servers from the attack.

2. The method of claim 1, wherein said generating the attacking-clusters graph comprises:

generating a plurality of event data structures corresponding to the subset of request messages, wherein each of the plurality of event data structures includes a source identifier of a source of the corresponding request message and a destination identifier of a destination of the corresponding request message;

identifying a plurality of groupings of the generated event data structures, wherein each of the plurality of groupings corresponds to a time period of a plurality of different time periods and includes those of the generated event data structures corresponding to a request message that was received at a corresponding one of the one or more TMMs within the time period; and identifying, for each of the different time periods, groupings of source identifiers of the request messages corresponding to the event data structures of the time period, wherein generating the set of identifiers is based upon analyzing the groupings of source identifiers of each of the different time periods.

3. The method of claim 2, wherein said identifying the groupings of source identifiers for each of the different time periods comprises:

calculating a similarity score between each pair of source identifiers of those of the event data structures of the time period that have a same attack type, wherein the similarity score is based upon the destination identifiers of those event data structures that include one of the pair of source identifiers; and clustering, based upon the similarity scores, the source identifiers of those of the event data structures of the time period that have the same attack type.

4. The method of claim 2, wherein said generating the set of identifiers further comprises:

removing, from the set of identifiers, any identifier existing within a set of whitelisted source identifiers.

5. The method of claim 1, further comprising:

determining, by the BIM based at least in part upon the obtained traffic data, an attack duration of the suspected botnet, wherein the attack duration is an average attack duration or a maximum attack duration observed over a plurality of attacks observed from the suspected botnet; and transmitting the attack duration of the suspected botnet to the one or more TMMs to cause the one or more TMMs to utilize the attack duration while protecting the one or more servers from the suspected botnet.

6. The method of claim 1, wherein each identifier of the set of identifiers comprises an Internet Protocol (IP) address.

7. A non-transitory computer readable storage medium having instructions which, when executed by one or more processors of an electronic device, cause the electronic device to implement a botnet identification module (BIM) that performs operations for identifying a subset of a plurality of end stations that collectively act as a suspected botnet, the operations comprising:

obtaining traffic data from one or more traffic monitoring modules (TMMs) implemented by one or more electronic devices, wherein the traffic data includes or is based upon a plurality of request messages that were originated by ones of the plurality of end stations and that were destined to one or more servers, wherein each of the one or more TMMs is deployed in front of at least one of the one or more servers in that the TMM receives all network traffic originated by the plurality of end stations that is destined for the at least one server;

generating, based upon the obtained traffic data, a set of identifiers corresponding to the subset of the plurality of end stations that are determined by the BIM to be collectively acting as the suspected botnet in that they have transmitted request messages, destined for one or more of the one or more servers, that collectively or individually satisfy one or more security rules which, when satisfied, indicate a malicious attack, wherein the set of identifiers comprises a plurality of identifiers, wherein said generating the set of identifiers comprises:
identifying, from the traffic data, a subset of the plurality of request messages that are malicious,
generating an attacking-clusters graph based on the subset of request messages that is identified as being malicious, wherein the attacking-clusters graph includes vertices representing source clusters, wherein the attacking-clusters graph further includes edges between vertices in adjacent levels of the attacking-clusters graph, wherein an edge between vertices indicates that source clusters represented by those vertices share one or more common sources, wherein the vertices in the attacking-clusters graph are each assigned a weight representing a number of sources in a source cluster represented by that vertex, and wherein the edges in the attacking-clusters graph are each assigned a weight representing a number of common sources between source clusters represented by vertices connected by that edge, and
determining, based upon analyzing the attacking-clusters graph, that the subset of end stations have collectively performed the malicious attack for at least a threshold number of consecutive time periods and that at least a threshold number of the subset of end stations have been involved in the malicious attack for each of the threshold number of consecutive time periods; and
transmitting the set of identifiers to the one or more TMMs to cause the one or more TMMs to utilize the set of identifiers while analyzing subsequent request messages destined to the one or more servers to detect an attack from the suspected botnet and to protect the one or more servers from the attack.

8. The non-transitory computer readable storage medium of claim 7, wherein said generating the attacking-clusters graph comprises:
generating a plurality of event data structures corresponding to the subset of request messages, wherein each of the plurality of event data structures includes a source identifier of a source of the corresponding request message and a destination identifier of a destination of the corresponding request message;
identifying a plurality of groupings of the generated event data structures, wherein each of the plurality of groupings corresponds to a time period of a plurality of different time periods and includes those of the generated event data structures corresponding to a request message that was received at a corresponding one of the one or more TMMs within the time period; and
identifying, for each of the different time periods, groupings of source identifiers of the request messages corresponding to the event data structures of the time period,
wherein generating the set of identifiers is based upon analyzing the groupings of source identifiers of each of the different time periods.

9. The non-transitory computer readable storage medium of claim 8, wherein said identifying the groupings of source identifiers for each of the different time periods comprises:
calculating a similarity score between each pair of source identifiers of those of the event data structures of the time period that have a same attack type, wherein the similarity score is based upon the destination identifiers of those event data structures that include one of the pair of source identifiers; and
clustering, based upon the similarity scores, the source identifiers of those of the event data structures of the time period that have the same attack type.

10. The non-transitory computer readable storage medium of claim 8, wherein said generating the set of identifiers further comprises:
removing, from the set of identifiers, any identifier existing within a set of whitelisted source identifiers.

11. The non-transitory computer readable storage medium of claim 7, further comprising:
determining, based at least in part upon the obtained traffic data, an attack duration of the suspected botnet, wherein the attack duration is an average attack duration or a maximum attack duration observed over a plurality of attacks observed from the suspected botnet; and
transmitting the attack duration of the suspected botnet to the one or more TMMs to cause the one or more TMMs to utilize the attack duration while protecting the one or more servers from the suspected botnet.

12. The non-transitory computer readable storage medium of claim 7, wherein each identifier of the set of identifiers comprises an Internet Protocol (IP) address.

13. An electronic device, comprising:
one or more processors; and
one or more non-transitory computer readable storage media having instructions which, when executed by the one or more processors, cause the electronic device to implement a botnet identification module (BIM) to identify a subset of a plurality of end stations that collectively act as a suspected botnet, the BIM to:
obtain traffic data from one or more traffic monitoring modules (TMMs) implemented by one or more electronic devices, wherein the traffic data includes or is based upon a plurality of request messages that were originated by ones of the plurality of end stations and that were destined to one or more servers, wherein each of the one or more TMMs is deployed in front of at least one of the one or more servers in that the TMM receives all network traffic originated by the plurality of end stations that is destined for the at least one server;
generate, based upon the obtained traffic data, a set of identifiers corresponding to the subset of the plurality of end stations that are determined by the BIM to be collectively acting as the suspected botnet in that they have transmitted request messages, destined for one or more of the one or more servers, that collectively or individually satisfy one or more security rules which, when satisfied, indicate a malicious attack, wherein the set of identifiers comprises a plurality of identifiers, wherein to generate the set of identifiers the BIM is to:
identify, from the traffic data, a subset of the plurality of request messages that are malicious,
generate an attacking-clusters graph based on the subset of request messages that is identified as being malicious, wherein the attacking-clusters graph includes vertices representing source clusters, wherein the attacking-clusters graph further includes edges between vertices in adjacent levels of the attacking-clusters graph, wherein an edge between vertices indicates that source clusters represented by those vertices share one or more common sources, wherein the vertices in the attacking-clusters graph are each assigned a weight representing a number of sources in a source cluster represented by that vertex, and wherein the edges in the attacking-clusters graph are each assigned a weight representing a number of common sources between source clusters represented by vertices connected by that edge, and determine, based upon analyzing the attacking-clusters graph, that the subset of end stations have collectively performed the malicious attack for at least a threshold amount of time which includes a threshold number of consecutive time periods and that at least a threshold number of the subset of end stations have been involved in the malicious attack for each of the threshold number of time periods within the threshold amount of time, wherein the analyzing includes finding paths in the attacking-clusters graph that only contain edges with a threshold weight, that only pass through vertices with a threshold weight, and that have a length longer than a threshold length; and transmit the set of identifiers to the one or more TMMs to cause the one or more TMMs to utilize the set of identifiers while analyzing subsequent request messages destined to the one or more servers to detect an attack from the suspected botnet and to protect the one or more servers from the attack.

14. The electronic device of claim 13, wherein the BIM, to determine that the subset of end stations have collectively performed the malicious attack for at least the threshold amount of time and that at least the threshold number of the subset of end stations have been involved in the malicious attack for each of the threshold number of time periods within the threshold amount of time, is to:

generate a plurality of event data structures corresponding to the subset of request messages, wherein each of the plurality of event data structures includes a source identifier of a source of the corresponding request message and a destination identifier of a destination of the corresponding request message;

identify a plurality of groupings of the generated event data structures, wherein each of the plurality of groupings corresponds to a time period of a plurality of different time periods and includes those of the generated event data structures corresponding to a request message that was received at a corresponding one of the one or more TMMs within the time period; and identify, for each of the different time periods, groupings of source identifiers of the request messages corresponding to the event data structures of the time period, wherein said generation of the set of identifiers is based upon analyzing the groupings of source identifiers of each of the different time periods.

15. The electronic device of claim 14, wherein the BIM, to identify the groupings of source identifiers for each of the different time periods, is to:

calculate a similarity score between each pair of source identifiers of those of the event data structures of the time period that have a same attack type, wherein the similarity score is based upon the destination identifiers of those event data structures that include one of the pair of source identifiers; and cluster, based upon the similarity scores, the source identifiers of those of the event data structures of the time period that have the same attack type.

16. The electronic device of claim 14, wherein the BIM, to generate the set of identifiers, is to further:

remove, from the set of identifiers, any identifier existing within a set of whitelisted source identifiers.

17. The electronic device of claim 13, wherein the BIM is further to:

determine, based at least in part upon the obtained traffic data, an attack duration of the suspected botnet, wherein the attack duration is an average attack duration or a maximum attack duration observed over a plurality of attacks observed from the suspected botnet; and transmit the attack duration of the suspected botnet to the one or more TMMs to cause the one or more TMMs to utilize the attack duration while protecting the one or more servers from the suspected botnet.

\* \* \* \* \*